US009156427B2

(12) United States Patent
Wang et al.

(10) Patent No.: US 9,156,427 B2
(45) Date of Patent: Oct. 13, 2015

(54) COST-EFFECTIVE USE OF ONE-PIECE WOVEN FABRIC FOR CURTAIN AIRBAGS

(71) Applicant: Autoliv ASP, Inc, Ogden, UT (US)

(72) Inventors: Xiaohong Wang, Roy, UT (US); Bryan Walston, Perry, UT (US); Arthur Yakumo, Salt Lake City, UT (US); Avadhoot Paranjpe, Roy, UT (US); Paul Hicken, Syracuse, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/150,678

(22) Filed: Jan. 8, 2014

(65) Prior Publication Data
US 2015/0191141 A1    Jul. 9, 2015

(51) Int. Cl.
*B60R 21/213* (2011.01)
*B60R 21/232* (2011.01)
*B60R 21/2338* (2011.01)
*B60R 21/231* (2011.01)
*B60R 21/16* (2006.01)

(52) U.S. Cl.
CPC ............ *B60R 21/213* (2013.01); *B60R 21/2338* (2013.01); *B60R 21/23138* (2013.01); *B60R 2021/161* (2013.01)

(58) Field of Classification Search
CPC ............... B60R 21/213; B60R 21/232; B60R 2021/23316; B60R 2021/2617; B60R 21/23138; B60R 21/2338; B60R 2021/161
USPC .................. 280/730.2, 743.1, 743.2
See application file for complete search history.

(56) References Cited

U.S. PATENT DOCUMENTS

| 5,322,322 | A |   | 6/1994  | Bark et al.          |
|-----------|---|---|---------|----------------------|
| 5,462,308 | A |   | 10/1995 | Seki et al.          |
| 5,570,900 | A | * | 11/1996 | Brown ........... 280/729 |
| 5,588,672 | A |   | 12/1996 | Karlow et al.        |
| 5,605,346 | A |   | 2/1997  | Cheung et al.        |
| 5,788,270 | A |   | 8/1998  | HÅland et al.        |
| 5,797,621 | A |   | 8/1998  | Ono                  |
| 5,865,462 | A |   | 2/1999  | Robins et al.        |
| 6,010,149 | A |   | 1/2000  | Riedel et al.        |
| 6,073,961 | A |   | 6/2000  | Bailey et al.        |
| 6,155,597 | A |   | 12/2000 | Bowers et al.        |
| 6,237,939 | B1|   | 5/2001  | Resh                 |
| 6,237,942 | B1| * | 5/2001  | Swann ........ 280/730.2 |
| 6,237,943 | B1|   | 5/2001  | Brown et al.         |

(Continued)

FOREIGN PATENT DOCUMENTS

DE    102009033375 A1 *  3/2011

*Primary Examiner* — Laura Freedman
(74) *Attorney, Agent, or Firm* — Madson IP, P.C.

(57) ABSTRACT

An airbag assembly may include an inflatable curtain airbag with a stowed configuration and a deployed configuration. The inflatable curtain may have a first chamber and a second chamber that inflates forward of the first chamber. The second chamber may have a height above the height of the first chamber so that a bottom of the second chamber is pressed downward adjacent to a door of the vehicle. A plurality of airbag assembly components may be integrally formed with a non-inflating peripheral region surrounding the first and second chambers. Such components may include a front or rear tether cut from the front or rear of the non-inflating peripheral region, a top tether cut from the top of the non-inflating peripheral region to control deployment of the second chamber, and a fabric shield cut from the top to at least partially wrap around the stowed inflatable curtain airbag.

3 Claims, 21 Drawing Sheets

(56) References Cited

U.S. PATENT DOCUMENTS

| | | | |
|---|---|---|---|
| 6,273,456 B1 * | 8/2001 | Heigl | 280/730.2 |
| 6,273,458 B1 | 8/2001 | Steffens, Jr. et al. | |
| 6,276,712 B1 * | 8/2001 | Welch et al. | 280/730.2 |
| 6,315,324 B1 | 11/2001 | Keshavaraj | |
| 6,361,068 B1 | 3/2002 | Stein et al. | |
| 6,375,214 B1 | 4/2002 | Nishikaji | |
| 6,428,037 B1 | 8/2002 | Bakhsh et al. | |
| 6,457,745 B1 | 10/2002 | Heigl | |
| 6,464,250 B1 | 10/2002 | Faigle et al. | |
| 6,474,678 B1 | 11/2002 | Boxey | |
| 6,557,892 B2 | 5/2003 | Herzog | |
| 6,616,179 B2 * | 9/2003 | Tanase et al. | 280/730.2 |
| 6,672,612 B2 | 1/2004 | Sauer et al. | |
| 6,688,641 B2 | 2/2004 | Dominissini | |
| 6,695,347 B2 | 2/2004 | Sonnenberg et al. | |
| 6,709,008 B2 | 3/2004 | McGee et al. | |
| 6,712,389 B2 | 3/2004 | Mauleon | |
| 6,733,035 B2 | 5/2004 | Thomas et al. | |
| 6,736,422 B2 * | 5/2004 | Nakanishi | 280/730.2 |
| 6,783,155 B2 | 8/2004 | Keshavaraj | |
| 6,796,583 B2 | 9/2004 | Keshavaraj | |
| 6,830,262 B2 * | 12/2004 | Sonnenberg et al. | 280/730.2 |
| 6,886,858 B2 | 5/2005 | Olson | |
| 6,938,922 B2 | 9/2005 | Keshavaraj | |
| 6,966,579 B2 | 11/2005 | Schneider et al. | |
| 6,991,255 B2 | 1/2006 | Henderson et al. | |
| 7,163,233 B2 | 1/2007 | Kino | |
| 7,264,267 B2 * | 9/2007 | Kino et al. | 280/728.2 |
| 7,571,930 B2 | 8/2009 | Osterhout et al. | |
| 7,686,332 B2 | 3/2010 | Abramczyk et al. | |
| 7,931,293 B2 * | 4/2011 | Slaats et al. | 280/730.2 |
| 8,020,888 B2 * | 9/2011 | Cheal et al. | 280/730.2 |
| 8,414,021 B2 * | 4/2013 | Tanaka et al. | 280/730.2 |
| 8,505,967 B2 * | 8/2013 | Shamoto | 280/730.2 |
| 8,708,365 B2 * | 4/2014 | Fulmer et al. | 280/728.2 |
| 8,770,618 B2 * | 7/2014 | Fukawatase et al. | 280/730.2 |
| 8,814,202 B2 * | 8/2014 | Matsushita et al. | 280/730.2 |
| 2002/0027353 A1 | 3/2002 | Keshavaraj | |
| 2006/0290122 A1 | 12/2006 | Woydick | |
| 2007/0046009 A1 | 3/2007 | Miura et al. | |
| 2007/0296189 A1 | 12/2007 | Berntsson et al. | |
| 2009/0058053 A1 | 3/2009 | Osterhout et al. | |
| 2010/0327564 A1 | 12/2010 | Cheal | |

* cited by examiner

COST-EFFECTIVE USE OF ONE-PIECE WOVEN FABRIC FOR CURTAIN AIRBAGS

TECHNICAL FIELD

The present invention relates to automotive safety. More specifically, the present invention relates to an inflatable airbag curtain and method that provide protection in small overlap and oblique frontal collisions and side collision situations.

BACKGROUND

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of a charge contained within an inflator. Expanding gases from the charge travel through conduits and fill the airbags, which immediately inflate in front of the driver and passenger to protect them from harmful impact with the interior of the car. Typically, airbags are concealed within the vehicle trim to be invisible during normal vehicle operation.

Airbag systems have also been developed in response to the need for similar protection from lateral impacts between a passenger and the side of a vehicle's interior. This might occur when another vehicle collides with the side of the vehicle, or in a rollover situation where the side of the vehicle is repeatedly impacting the ground. Side impact airbags are often called "inflatable curtains." Many inflatable curtains are stowed along the corner where the vehicle roof meets the side windows and pillars. These inflatable curtains may be stowed behind the headliner trim at the edge of the headliner, which is the fabric covering the roof of the vehicle.

Recent safety standards issued by various governments require more comprehensive protection in the event of a side or frontal collision. Additionally, there is an ongoing need to provide airbag systems that are more economical to manufacture and install, avoid interference with the ability of the automaker to position various features on the vehicle interior, and can be expected to deploy reliably. The passengers of a vehicle may be at any of a wide variety of positions within the vehicle at the time of deployment, so it is desirable to provide airbag systems that protect against impact over the broadest possible range of occupant locations.

It has been observed that some existing inflatable curtain designs do not provide adequate protection in the event of certain collision events, such as rollover collisions. In a rollover collision, the position and trajectory of vehicle occupants is difficult to predict. Accordingly, known inflatable curtains designed to protect against a pure lateral impact may not be in the proper position to provide the protection that is most needed. The result may be injuries from impact with interior vehicle surfaces and/or ejection from the vehicle, despite deployment of the airbag systems.

Additionally, it is desirable to reduce the cost, complexity, and manufacturing time of airbags. Many airbags are made from layers of material that are secured together to define the inflatable chambers of the airbag. Many known airbag designs have a substantial non-inflatable peripheral region that consists essentially of wasted fabric. The wasted fabric adds to the cost of the airbag because excessive fabric must be purchased and processed.

Furthermore, a wide variety of airbag system components may be used. Such components include a wide variety of tethers that help to control the deployment and/or positioning of the airbag. Such components are often formed separately from the airbag and attached to the airbag through the use of additional manufacturing steps. Thus, these accessories often add significantly to the cost and manufacturing time required to make the airbag.

SUMMARY OF THE INVENTION

The various systems and methods of the present disclosure have been developed in response to the present state of the art, and in particular, in response to the problems and needs in the art that have not yet been fully solved by currently available airbag systems and methods. Thus, it is advantageous to provide airbag systems and methods that provide reliable protection for vehicle occupants in a wide variety of collision situations. Further, it is advantageous to minimize manufacturing and installation costs. The airbag systems and methods of the present disclosure may have other benefits that are not specifically set forth herein.

To achieve the foregoing, and in accordance with this disclosure as embodied and broadly described herein, an airbag assembly may be disposed in a vehicle to shield a vehicle occupant from impacting at least one lateral surface of the vehicle. The airbag assembly may include an inflatable curtain airbag having a stowed configuration and a deployed configuration into which the inflatable curtain airbag deploys between the vehicle occupant and the at least one lateral surface of the vehicle. The inflatable curtain airbag may include an inflatable curtain airbag having a stowed configuration proximate the roof of the vehicle and a deployed configuration into which the inflatable curtain airbag deploys downward between the vehicle occupant and the at least one lateral surface of the vehicle, the inflatable curtain airbag comprising an inboard fabric layer and an outboard fabric layer that are secured together at a peripheral juncture that defines, interior to the peripheral juncture, a first chamber, and, exterior to the peripheral juncture, a non-inflating peripheral region. The inflatable curtain airbag may further include a tether comprising a first end and a second end securable to the vehicle, wherein the tether comprises a first segment and a second segment that at least partially overlies the first segment. Each of the first and second segments may include a first fabric layer formed as a single piece with the inboard fabric layer, and a second fabric layer formed as a single piece with the outboard fabric layer. The first chamber may inflate to move the inflatable airbag curtain from the stowed configuration to the deployed configuration.

The non-inflating peripheral region may include a rear portion positioned rearward of the first chamber in the deployed configuration. The first end of the tether may be positioned in the rear portion such that the tether, in the deployed configuration, exerts rearward tension on the inflatable curtain airbag.

The first and second segments of the tether may be removed from adjacent portions of the non-inflating peripheral region. The first end of the tether may include a first fold in the first segment and a second fold in the second segment. The first and second folds may be oriented to position the first and second segments to overlie each other.

The first and second folds may position the tether substantially perpendicular to the adjacent portions of the non-inflating peripheral region. The first end of the tether further may have a reinforcement panel secured to the first and second segments and to the non-inflating peripheral region. The reinforcement panel may also be removed from the non-inflating peripheral region. The airbag assembly may further include an inflator. The peripheral juncture may further define an inflation conduit positioned to convey gas from the inflator into the first chamber.

According to one embodiment, an airbag assembly may be disposed proximate a roof of a vehicle to shield a vehicle occupant from impacting at least one lateral surface of the vehicle. The airbag assembly may include an inflatable curtain airbag having a stowed configuration proximate the roof of the vehicle and a deployed configuration into which the inflatable curtain airbag deploys downward between the vehicle occupant and the at least one lateral surface of the vehicle. The inflatable curtain airbag may have an inboard fabric layer and an outboard fabric layer that are secured together at a peripheral juncture that defines, interior to the peripheral juncture, a first chamber and a second chamber forward of the first chamber, and, exterior to the peripheral juncture, a non-inflating peripheral region. The airbag assembly may further include a tether with a first end and a second end securable to the vehicle. Each of the first and second chambers may inflate to move the inflatable airbag curtain from the stowed configuration to the deployed configuration. The non-inflating peripheral region may have a top portion positioned above the first and second chamber in the deployed configuration. The tether may have a first fabric layer formed as a single piece with the inboard fabric layer within the top portion above the second chamber, and a second fabric layer formed as a single piece with the outboard fabric layer within the top portion above the second chamber.

The second chamber may pivot relative to the first chamber during deployment. In the deployed configuration, the tether may exert tension to control an orientation of the second chamber relative to the first chamber.

The airbag assembly may further include an inflator. The peripheral juncture may further define an inflation conduit that separates the top portion of the non-inflating peripheral region into a forward section and a rearward section. The inflation conduit may be positioned to convey gas from the inflator into the first chamber. The tether may be removed from the forward section of the top portion of the non-inflating peripheral region.

According to one embodiment of the invention, an airbag assembly may be disposed proximate a roof of a vehicle to shield a vehicle occupant from impacting at least one lateral surface of the vehicle. The airbag assembly may include an inflatable curtain airbag having a stowed configuration proximate the roof of the vehicle and a deployed configuration into which the inflatable curtain airbag deploys downward between the vehicle occupant and the at least one lateral surface of the vehicle. The inflatable curtain airbag may have an inboard fabric layer and an outboard fabric layer that are secured together at a peripheral juncture that defines, interior to the peripheral juncture, a first chamber, and, exterior to the peripheral juncture, a non-inflating peripheral region. The airbag assembly may further include a fabric shield comprising a first fabric layer formed as a single piece with one of the inboard fabric layer within the non-inflating peripheral region and the outboard fabric layer within the non-inflating peripheral region. In the stowed configuration, the first fabric layer may be wrapped at least partially around a length of the inflatable curtain airbag. The first chamber may inflate to move the inflatable airbag curtain from the stowed configuration to the deployed configuration.

The fabric shield may be wrapped entirely around the length of the inflatable curtain airbag. The first fabric layer may be formed as a single piece with the inboard fabric layer. The fabric shield may further include a second fabric layer formed as a single piece with the outboard fabric layer. The second fabric layer may be wrapped at least partially around the length of the inflatable curtain airbag.

The second fabric layer may be wrapped in a second direction opposite to a first direction in which the first fabric layer is wrapped. In the stowed configuration, one of the first and second fabric layers may at least partially cover the other of the first and second fabric layers.

The airbag assembly may further include a plurality of mounting assemblies. Each of the mounting assemblies may have a tab securable to the vehicle, and a wrapper that wraps around the fabric shield and the inflatable airbag curtain to keep the inflatable airbag curtain in the stowed configuration until deployment.

The airbag assembly may further have an inflator. The peripheral juncture may further define an inflation conduit that separates a top portion of the non-inflating peripheral region positioned above the first chamber in the deployed configuration into forward and rearward sections. The inflation conduit may be positioned to convey gas from the inflator into the first chamber. The fabric shield may be removed from the rearward section of the top portion of the non-inflating peripheral region.

According to one embodiment of the invention, an airbag assembly may be disposed proximate a roof of a vehicle to shield a vehicle occupant from impacting at least one lateral surface of the vehicle. The airbag assembly may include an inflatable curtain airbag having a stowed configuration proximate the roof of the vehicle and a deployed configuration into which the inflatable curtain airbag deploys downward between the vehicle occupant and the at least one lateral surface of the vehicle. The inflatable curtain airbag may have an inboard fabric layer and an outboard fabric layer that are secured together at a peripheral juncture that defines, interior to the peripheral juncture, a first chamber and a second chamber, and, exterior to the peripheral juncture, a non-inflating peripheral region. To move the inflatable curtain airbag from the stowed configuration to the deployed configuration, the first chamber may inflate and the second chamber may inflate forward of the first chamber. In the deployed configuration, the peripheral juncture may have a top portion with a rearward section defining an upper boundary of the first chamber, and a forward section defining an upper boundary of the second chamber. In the deployed configuration, the forward section may be vertically offset from the rearward section such that the forward section is higher than a portion of the rearward section adjacent to the forward section.

The vehicle may have an A-pillar, a window extending below the A-pillar, and a lateral surface positioned below the window. In the deployed configuration, the second chamber may extend below the A-pillar to a depth sufficient to traverse the window and position a bottom portion of the second chamber alongside the lateral surface.

In the deployed configuration, the forward section may abut a roof of the vehicle to urge downward motion of a bottom portion of the second chamber. The airbag assembly may further have an inflator. The rearward section of the peripheral juncture may further define an inflation conduit positioned to convey gas from the inflator into the first chamber. Prior to installation in the vehicle, the inflation conduit and the second chamber may extend to approximately equal heights above the first chamber.

According to one embodiment, an airbag assembly may be disposed proximate a roof of a vehicle to shield a vehicle occupant from impacting at least one lateral surface of the vehicle. The airbag assembly may include an inflatable curtain airbag having a stowed configuration proximate the roof of the vehicle and a deployed configuration into which the inflatable curtain airbag deploys downward between the vehicle occupant and the at least one lateral surface of the vehicle. The inflatable curtain airbag may have an inboard fabric layer and an outboard fabric layer that are secured together at a peripheral juncture that defines, interior to the peripheral juncture, a first chamber and a second chamber forward of the first chamber, and, exterior to the peripheral juncture, a non-inflating peripheral region. The airbag assembly may further include a tether with a first end and a second end securable to the vehicle. The tether may have a first fabric layer formed as a single piece with the inboard fabric layer within the non-inflating peripheral region and a second fabric layer formed as a single piece with the outboard fabric layer within the non-inflating peripheral region. The airbag assembly may further include a fabric shield with a first fabric layer formed as a single piece with one of the inboard fabric layer within the non-inflating peripheral region and the outboard fabric layer within the non-inflating peripheral region. In the stowed configuration, the first fabric layer may be wrapped at least partially around a length of the inflatable curtain airbag. To move the inflatable curtain airbag from the stowed configuration to the deployed configuration, the first chamber may inflate and the second chamber may inflate forward of the first chamber. In the deployed configuration, the peripheral juncture may have a top portion with a rearward section defining an upper boundary of the first chamber, and a forward section defining an upper boundary of the second chamber. In the deployed configuration, the forward section may be vertically offset from the rearward section such that the forward section is higher than a portion of the rearward section adjacent to the forward section.

These and other features and advantages of the present disclosure will become more fully apparent from the following description and appended claims, or may be learned by the practice of the various exemplary embodiments of airbag systems and methods as set forth hereinafter.

BRIEF DESCRIPTION OF THE DRAWINGS

Exemplary embodiments of this disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of this disclosure will be described with additional specificity and detail through use of the accompanying drawings in which:

DETAILED DESCRIPTION

Exemplary embodiments of the present disclosure will be best understood by reference to the drawings, wherein like parts are designated by like numerals throughout. It will be readily understood that the components of the present disclosure, as generally described and illustrated in the Figures herein, could be arranged and designed in a wide variety of different configurations. Thus, the following more detailed description of the embodiments of the apparatus, system, and method of the present disclosure, as represented in FIGS. 1 through 21, is not intended to limit the scope of the invention, as claimed, but is merely representative of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature. "Exemplary" as used herein means serving as a typical or representative example or instance, and does not necessarily mean special or preferred.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to any airbag type.

Figure 1:
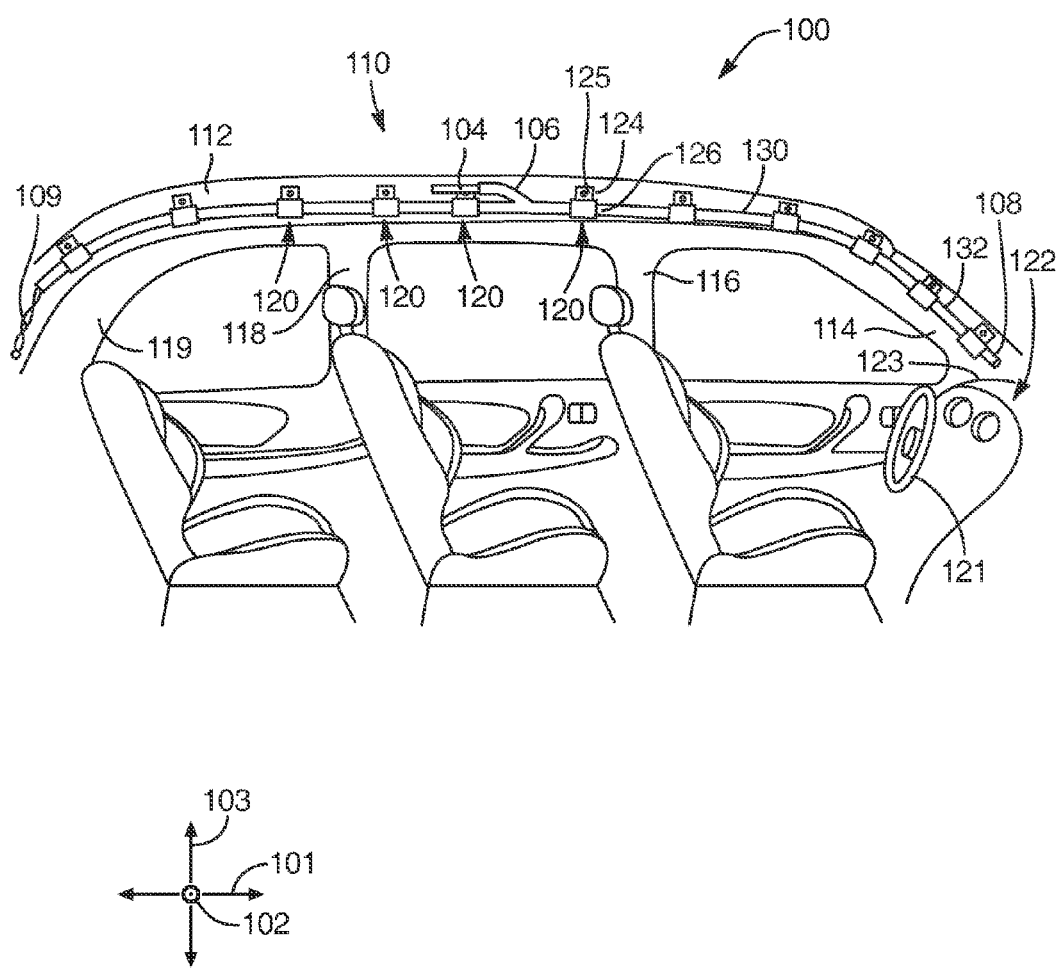
FIG. 1 is a side elevation view of an airbag assembly in a stowed configuration within a vehicle according to one exemplary embodiment of the invention.

Referring to FIG. 1, an airbag assembly 100 may be used to protect the passengers of a vehicle during a side collision or roll-over collision. The vehicle may have a longitudinal direction 101 oriented along the length of the vehicle, a lateral direction 102 oriented from one side of the vehicle to the opposing side, e.g., into and out of the page in the view of FIG. 1, and a transverse direction 103 oriented upward and downward. The terms "inboard" and "outboard" may be used to refer to the position of an object along the lateral direction 102. "Outboard" relates to placement of an object relatively closer than a second object to a lateral plane of the vehicle, which is either of two planes perpendicular to the lateral direction 102, one of which barely touches the very leftward terminus of the vehicle, and the other of which barely touches the very rightward terminus of the vehicle. "Inboard" relates to placement of an object relatively closer than a second object to a medial plane of the vehicle, which is the plane perpendicular to the lateral direction 102 that bisects the vehicle into two equal halves. "Inboard" and "outboard" do not require alignment of the two objects in the lateral direction 102; rather, these terms simply relate to proximity to the lateral or medial planes as set forth above.

The terms "rearward" and "forward" relate to the relative positions of the objects along the longitudinal direction 101. "Forward" relates to placement of an object relatively closer than a second object to a frontal plane of the vehicle, which is a plane perpendicular to the longitudinal direction 101 that barely touches the very frontward terminus of the vehicle. Similarly, "rearward" relates to placement of an object relatively closer than another object to a rear plane of the vehicle, which is a plane perpendicular to the longitudinal direction 101 that barely touches the very rearward terminus of the vehicle. An object that is "forward" of a second object need not be aligned with the second object in the longitudinal direction 101; it simply means that the first object is closer to the frontal plane of the vehicle than the second object. The term "rearward" similarly does not require alignment in the longitudinal direction 101.

The term "lateral" refers to a direction, object, or surface that pertains to the lateral direction 102. The "lateral surfaces" of the vehicle are the interior surfaces of the vehicle that face generally (but not necessarily precisely) toward the medial plane of the vehicle.

The airbag assembly 100 may include an inflator 104, a tube 106, and an inflatable curtain airbag 110 that receives gas from the inflator 104 via the tube 106. The airbag assembly 100 may also have a sensor and a control system (not shown) that detects a collision or impending collision and transmits an activation signal to the inflator 104. The inflator 104 may be one of several types, such as pyrotechnic, stored gas, or a combination inflator and may be a single or multistage inflator. The inflator 104 may be stored at any suitable location relative to the inflatable curtain airbag 110. If the inflator 104 is a pyrotechnic inflator, the inflator 104 may contain a propellant that ignites to rapidly produce inflation gas in response to receipt of the activation signal.

The inflatable curtain airbag 110 may extend along the longitudinal direction 101 within the vehicle. The inflatable curtain airbag 110 may be coupled to or next to a roof rail 112 of the vehicle. The airbag assembly 100 may also include a forward tether 108 and a rear tether 109 that are coupled proximate the front and rear ends, respectively, of the inflatable curtain airbag 110. Upon inflation of the inflatable curtain airbag 110, the forward tether 108 and the rear tether 109 may provide tension that helps keep the inflatable curtain airbag 110 in place.

In the event of a collision, the inflatable curtain airbag 110 may expand downward along the side of the vehicle between the vehicle passengers and one or more lateral surfaces of the vehicle such as the side windows and pillars (the structures between the lateral windows and/or the windshield and rear window) of the vehicle. The pillars may include an A-pillar 114, a B-pillar 116, a C-pillar 118, and, if present, a D-pillar 119, all of which may join the roof rail at their upper ends. In some embodiments, an inflatable curtain airbag may extend from an A-pillar to a C-pillar of the vehicle. In other embodiments such as that illustrated in FIG. 1, the inflatable curtain airbag 110 may extend from the A-pillar 114 to a D-pillar 119 of the vehicle.

In addition to the airbag assembly 100, other airbags may be installed in the vehicle. For example, a separate driver's side airbag (not shown in FIG. 1) may be used to protect an occupant (i.e., the driver) from impact with various forward surfaces of the vehicle, including the steering wheel 121 and instrument panel 122. The airbag assembly 100 may provide supplemental protection by cushioning impact not only against the lateral surfaces mentioned previously, but also cushioning impact against the A-pillar and/or an outboard portion 123 of the instrument panel 122. The outboard portion 123 is the portion of the instrument panel 122 that lies generally outboard of the steering wheel 121.

The inflatable curtain airbag 110 may normally reside in a stowed configuration, in which the inflatable curtain airbag 110 is concealed behind the interior trim of the vehicle, such as the lateral headliner trim (the trim that covers the edges of the headliner, which is typically a sheet of fabric that covers the interior of the vehicle roof). Prior to installation in the vehicle, the inflatable curtain airbag 110 may be compacted into the stowed configuration, such as by rolling, folding, or a combination thereof, such that the inflatable curtain airbag 110 assumes an elongated shape extending along a pathway with a length that is much greater than the height or width of its cross-sectional shape.

Once compacted into the stowed configuration, the inflatable curtain airbag 110 may be retained in the stowed configuration through the use of wrappers, fasteners, or the like to facilitate shipping and installation. The inflatable curtain airbag 110 may be secured to the vehicle proximate the roof rail 112. In the embodiment of FIG. 1, integrated wrappers and fastening systems may be provided in the form of a plurality of mounting assemblies 120 distributed along the length of the inflatable curtain airbag 110. Each of the mounting assemblies 120 may include a tab 124 secured to the inflatable curtain airbag 110, a fastener 125 that secures the tab 124 to the roof rail 112, and a wrapper 126 that encircles the inflatable curtain airbag 110 to keep the inflatable curtain airbag 110 in the stowed configuration until deployment.

In alternative embodiments, different mounting assemblies may be used. Such mounting assemblies may include tabs that are integrally formed with the inflatable curtain airbag, alternative fasteners, or the like. The wrappers 126 may not be present in all embodiments; other embodiments may utilize different features or attachment methods to keep the inflatable curtain airbag compacted. Such wrappers or other features may be independent of the mounting assemblies used to secure the inflatable curtain airbag to the vehicle.

As shown, the inflatable curtain airbag 110 may have a first protection zone 130 secured to the roof rail 112 and a second protection zone 132 secured to the pillar 114. Thus, the mounting assemblies 120 may be arranged along the length of the inflatable curtain airbag 110 from a rear location on or near the D-pillar to a forward location proximate a forward end of the A-pillar 114.

Upon activation, the inflator 104 may generate and/or release inflation gas into the tube 106. From the tube 106, the inflation gas may rapidly enter the inflatable curtain airbag 110, thereby causing the inflatable curtain airbag 110 to begin expanding. In response to the expansion, the wrappers 126 may break to release the inflatable curtain airbag 110. Thus, the inflatable curtain airbag 110 may exit the stowed configuration and assume an extended shape. This process is called "deployment." When deployment is complete, the inflatable curtain airbag 110 may be said to be in a deployed configuration, as will be shown and described in FIG. 2.

Figure 2:
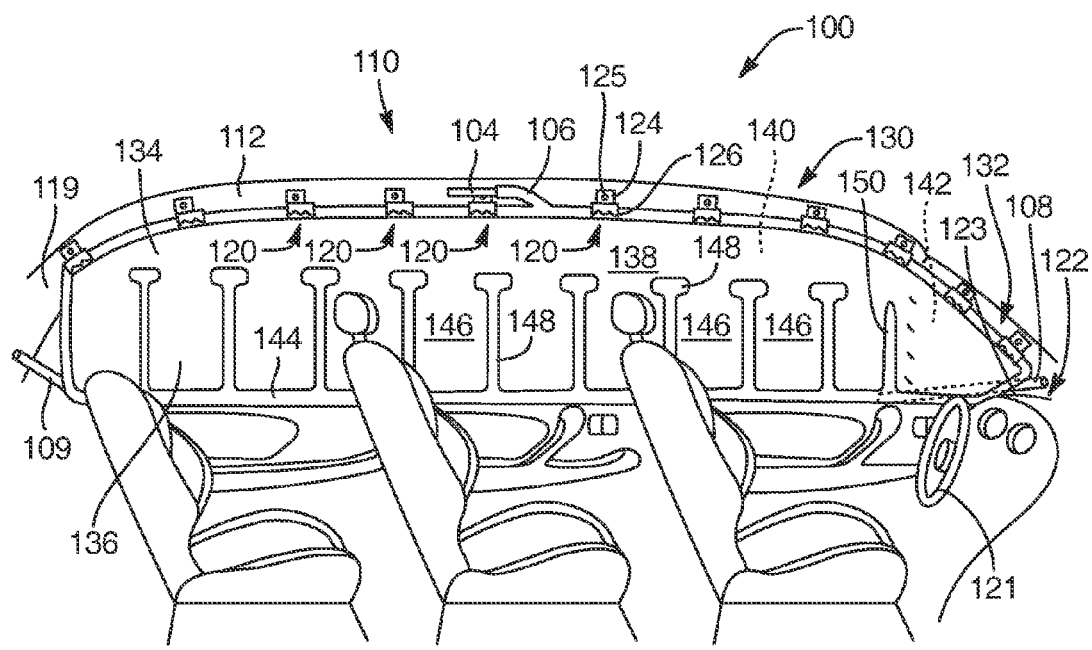
FIG. 2 is a side elevation view of the airbag assembly of FIG. 1, wherein the inflatable curtain airbag is in a deployed configuration.
Figure 2:
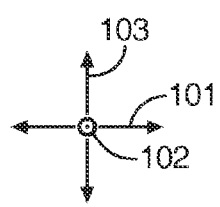

Referring to FIG. 2, a perspective view illustrates the airbag assembly 100, wherein the inflatable curtain airbag 110 is in the deployed configuration. The inflatable curtain airbag 110 may inflate upon activation of the inflator 104 and/or other optional inflators such that the inflatable curtain airbag 110 transitions from the stowed configuration to the deployed configuration. During deployment, the wrapper 126 may tear such that inflatable curtain airbag 110 can exit the stowed configuration. The inflatable curtain airbag 110 may also extend past a B-pillar 116 and a C-pillar 118 such that in a deployed configuration, the inflatable curtain airbag at least partially covers the B-pillar 116 and the C-pillar 118, as depicted in FIG. 2. The inflatable curtain airbag 110 may also cover a portion of the D-pillar 119.

FIG. 2 illustrates the positioning of the first protection zone 130 and the second protection zone 132. The first protection zone 130 may generally cover the lateral surfaces of the vehicle from the steering wheel rearward, while the second protection zone 132 covers the lateral surfaces forward of the steering wheel 121. The inflatable curtain airbag 110 may have an upper portion 134 and a lower portion 136.

Figure 3:
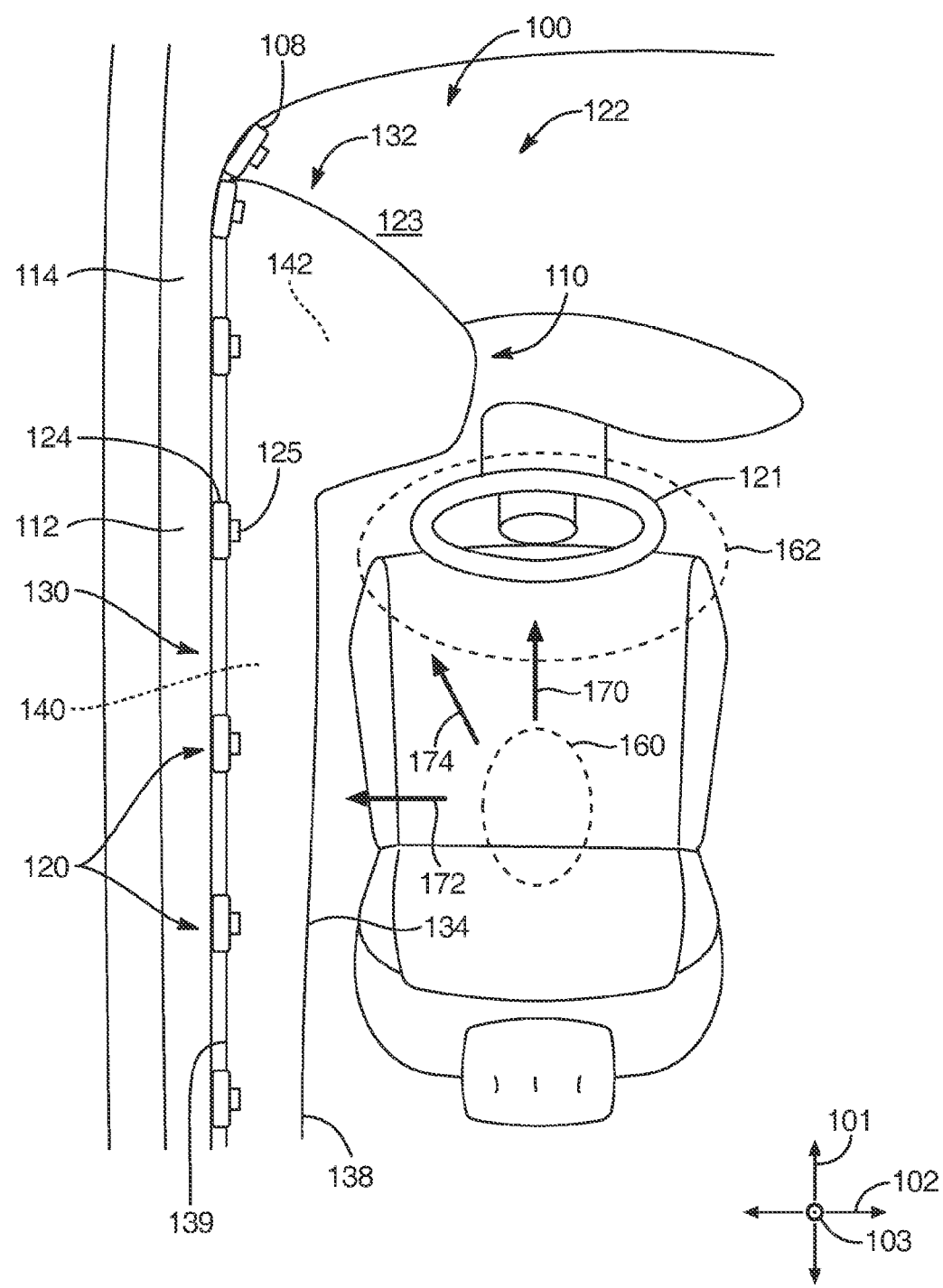
FIG. 3 is a top view of the airbag assembly of FIG. 1, wherein the inflatable curtain airbag is in the deployed configuration.

The inflatable curtain airbag 110 may be generally formed from two layers of flexible material such as a fabric or thin polymer, and may include an inboard section 138, and an outboard fabric layer in the form of an outboard section 139 (visible in FIG. 3). The inboard section 138 and the outboard section 139 may constitute a first fabric layer and a second fabric layer, respectively. According to one example, the inflatable curtain airbag 110 is generally made from a woven nylon fabric, but other fabrics or flexible materials may be used. The inboard section 138 and the outboard section 139 may be separate pieces of fabric, or may be sections of a single piece of fabric folded together. The inboard section 138 and the outboard section 139 may be secured together at a peripheral juncture, for example, via peripheral stitching 144, as shown. In the alternative, the inboard section 138 and the outboard section 139 may be secured together via mechanical fastening, adhesives, one-piece weaving, RF welding, ultrasonic welding, or any other suitable method known in the art.

The inboard section 138 and the outboard section 139 of the inflatable curtain airbag 110 may define a first chamber 140 within the first protection zone 130 and a second chamber 142 within the second protection zone 132. A "chamber" may be defined as an interior cavity within a body. The first chamber 140 may receive inflation gas from the inflator 104 via the fill tube 106. The second chamber 142 may receive inflation gas from the first chamber 140. As shown, the first chamber 140 may be divided into inflation cells 146 via interior stitching 148.

Referring to FIG. 3, a top view illustrates the airbag assembly 100 with the inflatable curtain airbag 110 in the deployed configuration. Additionally, FIG. 3 illustrates an occupant zone 160 that would ordinarily be occupied by a vehicle occupant's head, or more specifically, the driver's head, along with a deployed position 162 of an exemplary driver's side airbag.

Additionally, FIG. 3 shows a forward trajectory 170, an outboard trajectory 172, and a forward outboard trajectory 174 of the occupant's head relative to the vehicle. The forward trajectory 170 is where the head may move from the occupant zone 160 during an ordinary (i.e., not small overlap or oblique) frontal collision. The outboard trajectory 172 is where the head may move from the occupant zone 160 during a side impact, such as an impact against the side of the vehicle along which the inflatable curtain airbag 110 inflates. The forward outboard trajectory 174 is where the head may move from the occupant zone 160 during a small overlap or oblique collision.

As shown, the forward outboard trajectory 174 results from a rotation of the vehicle caused by the small overlap or oblique collision and may tend to move the occupant's head outboard of the steering wheel 121 to impact the A-pillar 114 and/or the outboard portion 123 of the instrument panel 122. Some vehicles may have doors that extend forward of the steering wheel 121, and accordingly, may have door trim or other door portions that may also be impacted in the event of a small overlap or oblique collision. The presence of the second protection zone 132 may serve to protect the head from such an impact. Thus, the second protection zone 132 may enable the airbag assembly 100 to provide enhanced protection in the event of a rollover or small overlap or oblique collision.

Depending on the layout of the interior stitching 148, the second protection zone 132 may inflate generally simultaneously with the first protection zone 130, or may only inflate after inflation of the first protection zone 130 has substantially completed. If the interior stitching 148, or more specifically, a chamber divider 150 of the interior stitching 148, is positioned to restrict inflation gas flow from the first protection zone 130 into the second protection zone 132, inflation of the second protection zone 132 may be delayed to the extent desired.

The second protection zone 132 may interact with the various interior structures of the vehicle, such as the A-pillar 114, the instrument panel 122, and the steering wheel 121. For example, the second protection zone 132 may butt up against any of these structures during deployment to provide some frictional engagement that helps the second protection zone 132 to remain in place during the potential impact of the occupant's head with the second protection zone 132.

The airbag assembly 100 is shown in use on the driver's side of the vehicle. A similarly configured (i.e., mirror image or near-mirror image) airbag assembly may be used on the passenger's side of the vehicle in addition or in the alternative to the airbag assembly 100. Such an airbag assembly may have a second protection zone similar to the second protection zone 132 to protect the front passenger from impact against the interior surfaces that correspond to the A-pillar 114, the steering wheel 121, and the outboard portion 123 of the instrument panel 122. For example, the passenger's side may have an A-pillar, glove compartment, dashboard, and/or instrument panel that may be beneficially covered by such a second protection zone 132.

The configuration of the airbag assembly 100 is merely exemplary. A variety of types and configurations of inflatable curtain airbags may be utilized within the scope of the present disclosure. For example, in alternative embodiments, varying sizes, shapes, and proportions of inflatable curtain airbags may be used. An automaker may select from such alternative embodiments based on the desired location within the vehicle, the anticipated collision type and severity, the likely habits of vehicle occupants, and any other criteria recognized by those of skill in the automotive safety arts.

In the embodiment of FIGS. 1-3, the second protection zone 132 may generally be stowed within the trim attached to the A-pillar 114. This may be suitable for some vehicles. However, in some embodiments, it may be desirable to minimize the airbag structure stowed on and/or secured to the A-pillar 114. Some vehicles, and in particular, compact cars, may have very limited space within the trim attached to the A-pillar 114. Additionally, it may be desirable to minimize the risk that any A-pillar trim elements or other components will be projected into the vehicle interior during deployment. Hence, in alternative embodiments, a second protection zone may be stored elsewhere.

Figure 4:
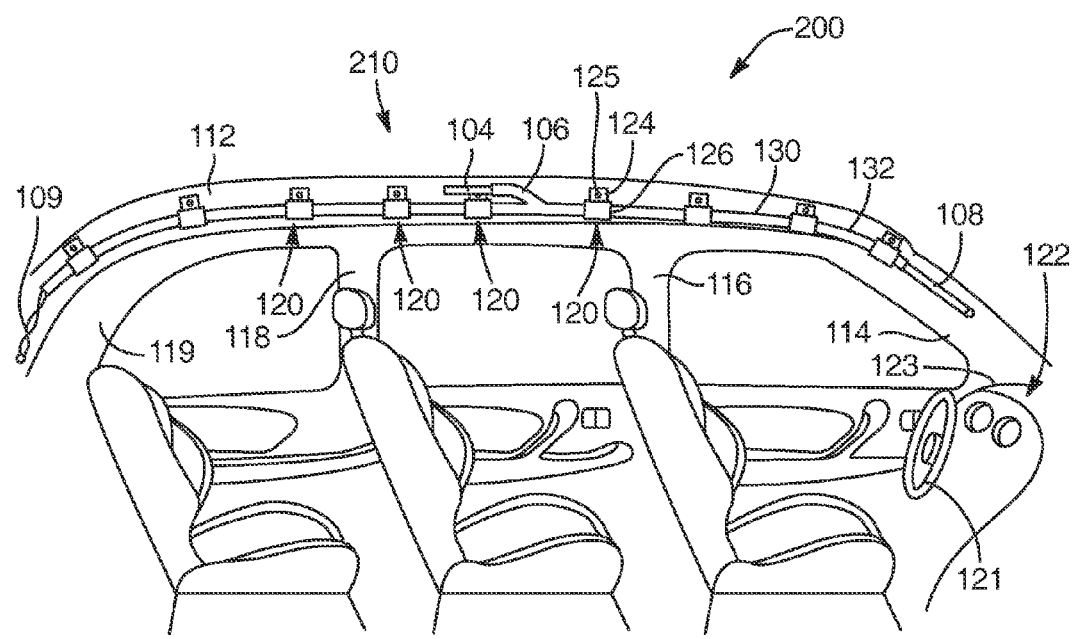
FIG. 4 is a side elevation view of an airbag assembly in a stowed configuration within a vehicle according to one exemplary alternative embodiment of the invention.
Figure 4:
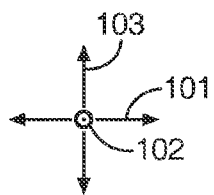

Referring to FIG. 4, a side elevation view illustrates an airbag assembly 200 according to an alternative exemplary embodiment of the invention, with an inflatable curtain airbag 210 in a stowed configuration within a vehicle. Like the airbag assembly 100, the airbag assembly 200 may include an inflator 104 connected to the inflatable curtain airbag 210 via a tube 106, and a forward tether 108 and a rear tether 109 that cooperate to provide tension to keep the inflatable curtain airbag 210 in position upon deployment. The inflatable curtain airbag 210 may be secured to the roof rail 112 via a plurality of mounting assemblies 120, each of which may include a tab 124, a fastener 125, and a wrapper 126. As in the previous embodiment, the wrappers 126 may break open during initial inflation of the inflatable curtain airbag 210 to permit deployment of the inflatable curtain airbag 210.

The inflatable curtain airbag 210 may be designed to minimize the need for storage of or attachment of airbag components to the A-pillar 114. Thus, the inflatable curtain airbag 210 may have a design in which the portions of the inflatable curtain airbag 210 that deploy forward of the steering wheel 121 are positioned adjacent to the forward portion of the roof rail 112 rather than stored within the trim on the A-pillar 114. More specifically, the inflatable curtain airbag 210 may have a first protection zone 230 that deploys generally rearward of the steering wheel 121, and a second protection zone 232 that deploys generally forward of the steering wheel 121. In the stowed configuration, the second protection zone 232 may be folded rearward to overlie the first protection zone 230. The term "overlie" refers to two objects with outward-facing surfaces that are positioned against each other.

Thus, the package defined by the inflatable curtain airbag 210 in the stowed configuration of FIG. 4 may be somewhat larger proximate the forward portion of the roof rail 112 than that of the inflatable curtain airbag 110 of the previous embodiment. None of the mounting assemblies 120 need be secured to the A-pillar 114. This leaves the A-pillar 114 free of airbag components apart from the forward tether 108. This may minimize the bulk of material stored within the trim on the A-pillar 114. Further, such a configuration may enhance the overall safety level of the airbag assembly 200 by reducing the risk of airbag components being projected from the A-pillar or the A-pillar trim during deployment of the airbag assembly 200.

In alternative embodiments of this disclosure, only one of the mounting assemblies (i.e., the forward-most mounting assembly) may be secured to the A-pillar. Many of the benefits cited above may still be obtained with such a configuration, particularly if the A-pillar trim is larger toward its juncture with the roof rail, thereby leaving more space at the top end of the A-pillar.

Figure 5:
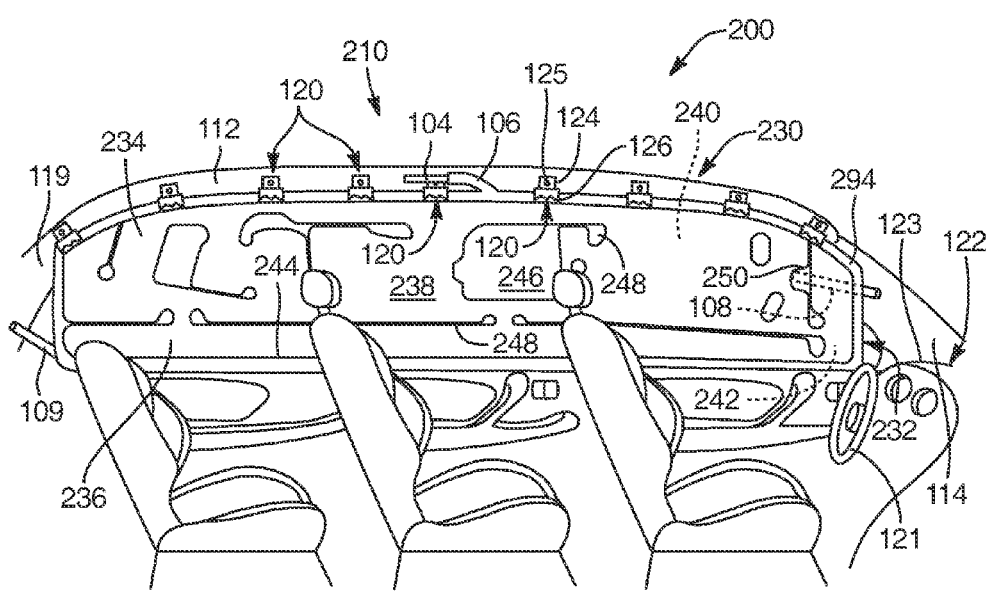
FIG. 5 is a side elevation view of the airbag assembly of FIG. 4, wherein the inflatable curtain airbag is in a deployed configuration.
Figure 5:
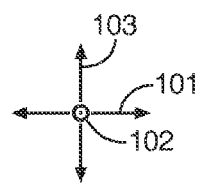

Referring to FIG. 5, a side elevation view illustrates the airbag assembly 200 of FIG. 4, with the inflatable curtain airbag 210 in the deployed configuration. Deployment may initially occur substantially as set forth above in the description of the airbag assembly 100 of FIGS. 1-3. Thus, as shown, the wrappers 126 may break open to release the inflatable curtain airbag 210, and the inflatable curtain airbag 210 may extend downward to protect occupants of the vehicle from impact against the lateral surfaces of vehicle.

As shown, the inflatable curtain airbag 210 has a configuration generally similar to that of the inflatable curtain airbag 110, with some differences. The inflatable curtain airbag 210 may have an upper portion 234 and a lower portion 236. The inflatable curtain airbag 210 may be formed by an inboard section 238 and an outboard section 239 that are secured together through any of the methods mentioned previously at a peripheral juncture, for example, with peripheral stitching 244. A "peripheral juncture" may be any feature by which inboard and outboard elements are joined to define an interior chamber. Thus, the peripheral stitching 244 is only one of many possible embodiments of a peripheral juncture. Other embodiments include an ultrasonically welded juncture, a one-piece woven juncture, an adhesive or chemically bonded juncture, a mechanically fastened juncture, an RF welded juncture, and the like.

The inboard section 238 and the outboard section 239 may constitute a first fabric layer and a second fabric layer, respectively. Interior stitching 248 may be applied interior to the peripheral stitching 244. The inboard section 238 and the outboard section 239 may cooperate to define a first chamber 240 within the first protection zone 230 and a second chamber 242 within the second protection zone 232. The boundaries of the first chamber 240 and the second chamber 242 may be defined by the geometry of the peripheral stitching 244 and the interior stitching 248.

The inflatable curtain airbag 210 may not have inflation cells like the inflation cells 146 of the previous embodiment, but may, instead, have a plurality of non-inflating regions 246 defined by the interior stitching 248. The non-inflating regions 246 may be positioned proximate areas where impact from a vehicle occupant is unlikely, or where it is desirable to attach a tether or another airbag component. Such attachment may beneficially be done at the non-inflating regions 246 because the attachment can be carried out through the inboard section 238 and the outboard section 239 without impeding the inflation of the inflatable curtain airbag 210. The non-inflating regions 246 may also serve to reduce the volume of the inflatable curtain airbag 210 in the deployed configuration, thereby reducing the amount of inflation gas required, and thence, the size of the inflator 104.

A chamber divider 250 of the interior stitching 248 may be positioned between the first protection zone 230 and the second protection zone 232, and may thus separate the first chamber 240 from the second chamber 242. The chamber divider 250 may restrict the flow of inflation gas from the first chamber 240 into the second chamber 242, and may thus cause the first protection zone 230 to inflate generally prior to inflation of the second protection zone 232.

The second protection zone 232 may be much different from the second protection zone 132 of the previous embodiment in that the second protection zone 232 may be much more compact, and may be relatively narrow when deployed. This may help ensure that the inflatable curtain airbag 210, and particularly the enlarged, forward portion of the inflatable curtain airbag 210 where the second protection zone 232 overlies the first protection zone 230, compacts into the space provided for it in the trim for the roof rail 112.

During deployment, the inflation of the first protection zone 230 and the second protection zone 232 may cause the second protection zone 232 to generally pivot forward from its stowed position overlying the first protection zone 230. Thus, the second protection zone 232 may first pivot inboard until it extends in the lateral direction 102, wherein it is generally perpendicular to the first protection zone 230. From this position, the second protection zone 232 may continue to pivot forward, but now may pivot outboard. If left unchecked, this motion may continue until the second protection zone 232 is generally parallel to the first protection zone 230.

If the second protection zone 232 is permitted to fully unfold, i.e., pivot outboard until it is generally parallel to the first protection zone 230, it may no longer be optimally positioned to prevent impact of the occupant in the event of a small overlap collision. More precisely, such positioning may allow the driver's head to move along the forward outboard trajectory 174 as shown in FIG. 3, and move between the second protection zone 232 and the driver's side airbag. Thus, it is desirable to provide some mechanism for keeping the second protection zone 232 at an angle of less than 180° relative to the first protection zone 230, as viewed from the top. This angle will be shown in greater detail in FIG. 7.

A restraint member may be used to keep the second protection zone 232 from pivoting outboard into a position parallel to the first protection zone 230. A "restraint member" may be defined as any structure that serves to restrict the position and/or orientation of an object. In the airbag assembly 200, the restraint member may limit outboard motion of the second protection zone 232 during deployment.

In the airbag assembly 200, the restraint member may take the form of a tether 280 with a first end 282 secured to the first protection zone 230 and a second end 284 secured to the second protection zone 232. The first end 282 may be secured proximate a top edge of the first protection zone 230, and may be secured to the first protection zone 230 itself, or to a part of the vehicle such as the roof rail 112. In FIG. 5, the first end 282 is secured to one of the mounting assemblies 120, and may thus be secured to the roof rail 112 with the fastener 125 used to secure the tab 124 of the mounting assembly 120 to the roof rail 112. The second end 284 may be secured directly to the top edge of the second protection zone 232.

In alternative exemplary embodiments, such a restraint member may have a variety of configurations including flexible members such as cords or tethers, or rigid members such as rails, brackets, or the like. A rail (not shown) may have a sliding element such as a ring connected to the cushion, and may be secured proximate the roof of the vehicle to limit outboard and/or forward motion of the second protection zone 232. A bracket (not shown) or other hard stop may deploy downward from the vehicle roof to directly block forward and/or outboard motion of the second protection zone 232. Those of skill in the art will recognize that many other alternative devices may be used to restrict forward and/or outboard motion of the second protection zone 232.

Figure 6:
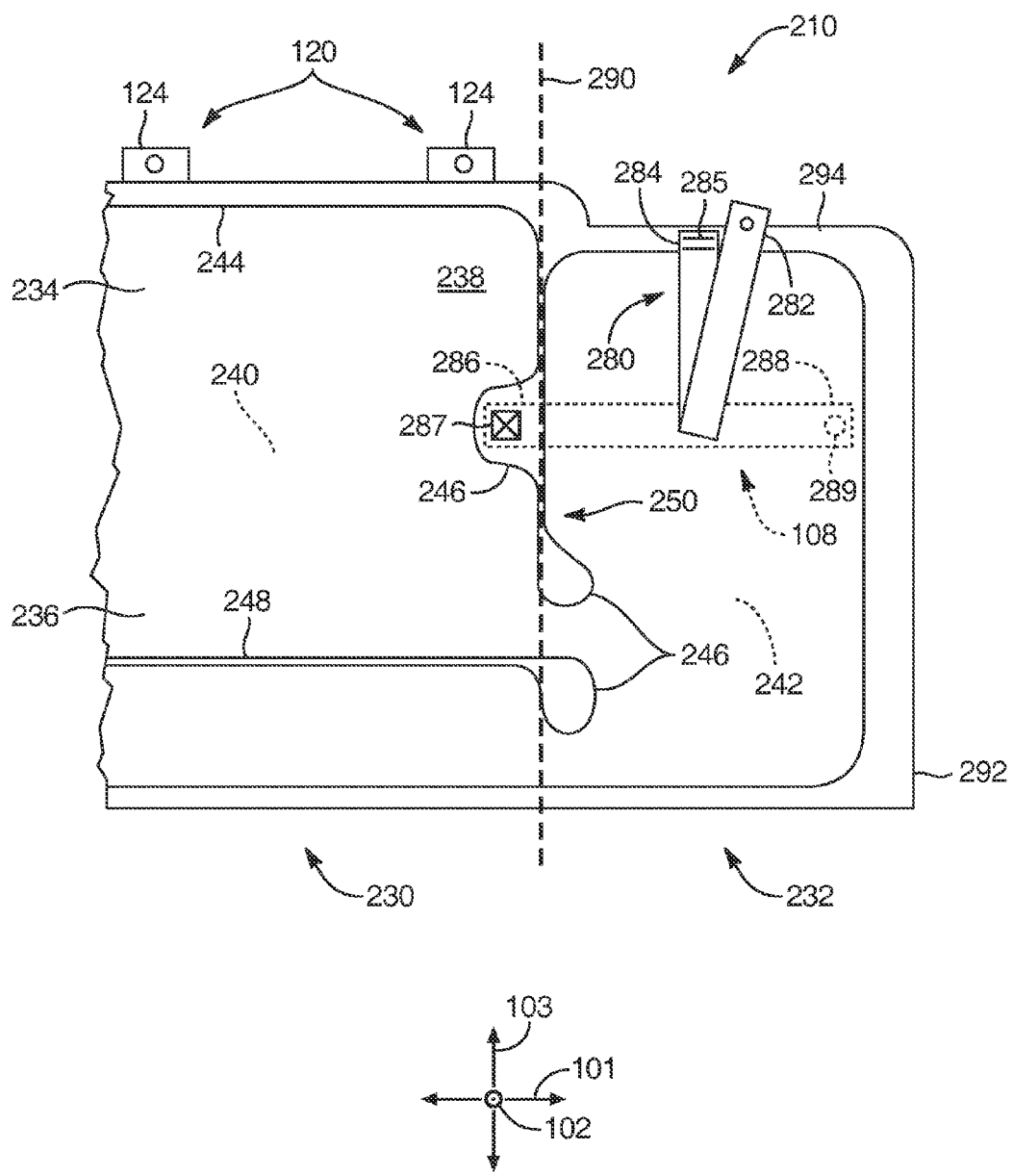
FIG. 6 is a side elevation view of the forward portion of the inflatable curtain airbag of the airbag assembly of FIG. 4, prior to compaction of the inflatable curtain airbag into the stowed configuration.

Referring to FIG. 6, a side elevation view illustrates the forward portion of the inflatable curtain airbag 210 of the airbag assembly 200 of FIG. 4, prior to compaction of the inflatable curtain airbag 210 into the stowed configuration. As shown, the chamber divider 250 may extend along most of the height of the inflatable curtain airbag 210 between the first chamber 240 and the second chamber 242. The forward tether 108 may have first end 286 secured to the inflatable curtain airbag 210 and a second end 288 securable to the vehicle. The first end 286 may be secured to the chamber divider 250, and more specifically, may be secured to a non-inflating region 246 that extends from the remainder of the chamber divider 250. The first end 286 may be secured to the region 246 via stitching 287. The second end 288 may have a hole 289 or other feature that facilitates attachment of the second end 288 to the A-pillar 114, for example, through the use of a fastener (not shown).

The chamber divider 250 may also form a natural fold line where, in the deployed configuration, the inflatable curtain airbag 210 is able to remain partially folded. It may be difficult to fold the inflatable curtain airbag 210 at other locations because the pressure of the inflation gas within the inflatable curtain airbag 210 and the manner in which the inflatable curtain airbag 210 bulges outward in the lateral direction 102 may tend to keep most regions of the inflatable curtain airbag 210 from bending away from the longitudinal direction 101. However, as the chamber divider 250 may extend along most of the height of the inflatable curtain airbag 210, the chamber divider 250 may provide a natural fold line.

The second chamber 242 of the second protection zone 232, as shown, is a single chamber. However, it should be understood that the second chamber 242 could be divided into multiple chambers without departing from the spirit of the invention. For example, the second chamber 242 could be divided into two adjacent chambers, a forward most chamber and an intermediate chamber. The intermediate chamber could have the chamber divider 250 at one side and the divider between the forward most chamber and the intermediate chamber at the other side. An airbag configuration with an intermediate chamber and a forward most chamber may align better along the contour of the side door, A-pillar, and instrument panel. One embodiment of the invention could have the intermediate chamber positioned to cushion the vehicle occupant from impacting the A-pillar and the forward most chamber positioned to cushion the vehicle occupant from impacting the instrument panel. Of course, a person of skill in the art, armed with the present disclosure, could determine a configuration using multiple chambers that would protect a vehicle occupant for a particular vehicle configuration.

The inflatable curtain airbag 210 may be folded at a stowed fold line 290 to compact it into the stowed configuration. As shown in FIG. 6, the stowed fold line 290 is the same as the natural fold line (i.e., the deployed fold line), and is thus defined by the chamber divider 250. In alternative embodiments, the inflatable curtain airbag 210 may be folded at a different location, i.e., either forward or rearward of the chamber divider 250. The location of the stowed fold line may have little impact on the deployed configuration of the inflatable curtain airbag 210 because the chamber divider 250 may determine where the fold is located in the deployed configuration.

The attachment location of the first end 286 of the forward tether 108 may be selected to provide the desired level of tension on the second protection zone 232. More specifically, securing the first end 286 forward of the chamber divider 250 may cause the forward tether 108 to exert tension in the longitudinal direction 101 on not only the first protection zone 230, but on the second protection zone 232 as well. Such tension may help unfold the second protection zone 232 by helping pivot the second protection zone 232 forward during deployment, but may also act to draw the second protection zone 232 toward a position in which the second protection zone 232 is parallel to the first protection zone 230. As set forth above, this may not be desirable.

Securing the first end 286 rearward of the chamber divider 250 may cause the forward tether 108 to exert tension in the longitudinal direction 101 on only the first protection zone 230. Securing the first end 286 directly on the chamber divider 250, or forward of, but close to, the chamber divider 250, may cause the forward tether 108 to exert some level of tension on the second protection zone 232, but with a short moment arm so that the resulting moment tending to pivot the second protection zone 232 forward is relatively small.

Hence, the attachment point of the first end 286 may be carefully selected to obtain the desired balance between expeditious deployment of the second protection zone 232 and maintenance of the second protection zone 232 at the proper orientation to provide protection in the event of a small overlap, oblique, or rollover collision. In the embodiment of FIG. 6, the first end 286 may be secured to the non-inflating region 246 of the chamber divider 250, which extends generally rearward of the remainder of the chamber divider 250. Thus, as configured in FIG. 6, the forward tether 108 may exert little, if any, longitudinal tension on the second protection zone 232.

The second end 284 of the tether 280 may be secured to a top edge 294 of the second protection zone 232, for example, via stitching 285. The second end 284 may be secured above the peripheral stitching 244 at the top of the second protection zone 232 so that the stitching 285 securing the second end 284 to the second protection zone 232 can extend through the inboard section 238 and the outboard section 239 without impeding inflation of the second protection zone 232.

The second end 284 may be secured to the top edge 294 at a location approximately equidistant from the deployed fold line, or the chamber divider 250, and a forward edge 292 of the second protection zone 232. Thus, the second end 284 may be secured at a location generally near the center of the second protection zone 232 in the longitudinal direction 101. This location may provide a balance between conserving tether material, which would favor attachment closer to the chamber divider 250, and providing a long moment arm to keep the second protection zone 232 in place in the event of relatively high-velocity motion of the occupant.

It may be desirable to moderate this moment arm to avoid keeping the second protection zone 232 in place too rigidly. More specifically, it may be advantageous to provide some ability for the second protection zone 232 to pivot outboard, toward a position parallel to the first protection zone 230, to soften the impact of the occupant against the second protection zone 232. The location of the second end 284 may be carefully selected to strike the optimal balance between rigidity and flexibility in the position of the second protection zone 232.

From the configuration of FIG. 6, the inflatable curtain airbag 210 may need to be at least partially compacted prior to attachment of the first end 282 of the tether 280 to the mounting assembly 120 that corresponds to it (i.e., the mounting assembly 120 on the left in FIG. 6) because the tether 280 may not be long enough to be simultaneously attached to the mounting assembly 120 and the desired location on the top edge 294 with the inflatable curtain airbag 210 laid flat as shown.

According to one example, with the second end 284 secured to the top edge 294 as shown, the inflatable curtain airbag 210 may be folded inboard at the stowed fold line 290. Thus, the forward edge 292 may be brought inboard, or out of the page with reference to the view of FIG. 6, and then brought rearward (or to the left in the view of FIG. 6) until the forward edge 292 overlies the corresponding region of the first protection zone 230. The fold line 290 may then be the forward edge of the inflatable curtain airbag 210. The first end 282 of the tether 280 may then be secured to the tab 124 of the mounting assembly 120. In the alternative, this may be done when the airbag assembly 200 is installed in the vehicle.

After the inflatable curtain airbag 210 has been folded in the longitudinal direction 101, the inflatable curtain airbag 210 may be rolled, folded, or otherwise compacted in the transverse direction 103. This may provide the elongated shape of the inflatable curtain airbag 210 in the stowed configuration. With the inflatable curtain airbag 210 in the stowed configuration, the mounting assemblies 120 may easily be secured to the roof rail 112 to install the inflatable curtain airbag 210 in the vehicle. As mentioned previously, none of the mounting assemblies 120 need be secured to the A-pillar 114.

Figure 7:
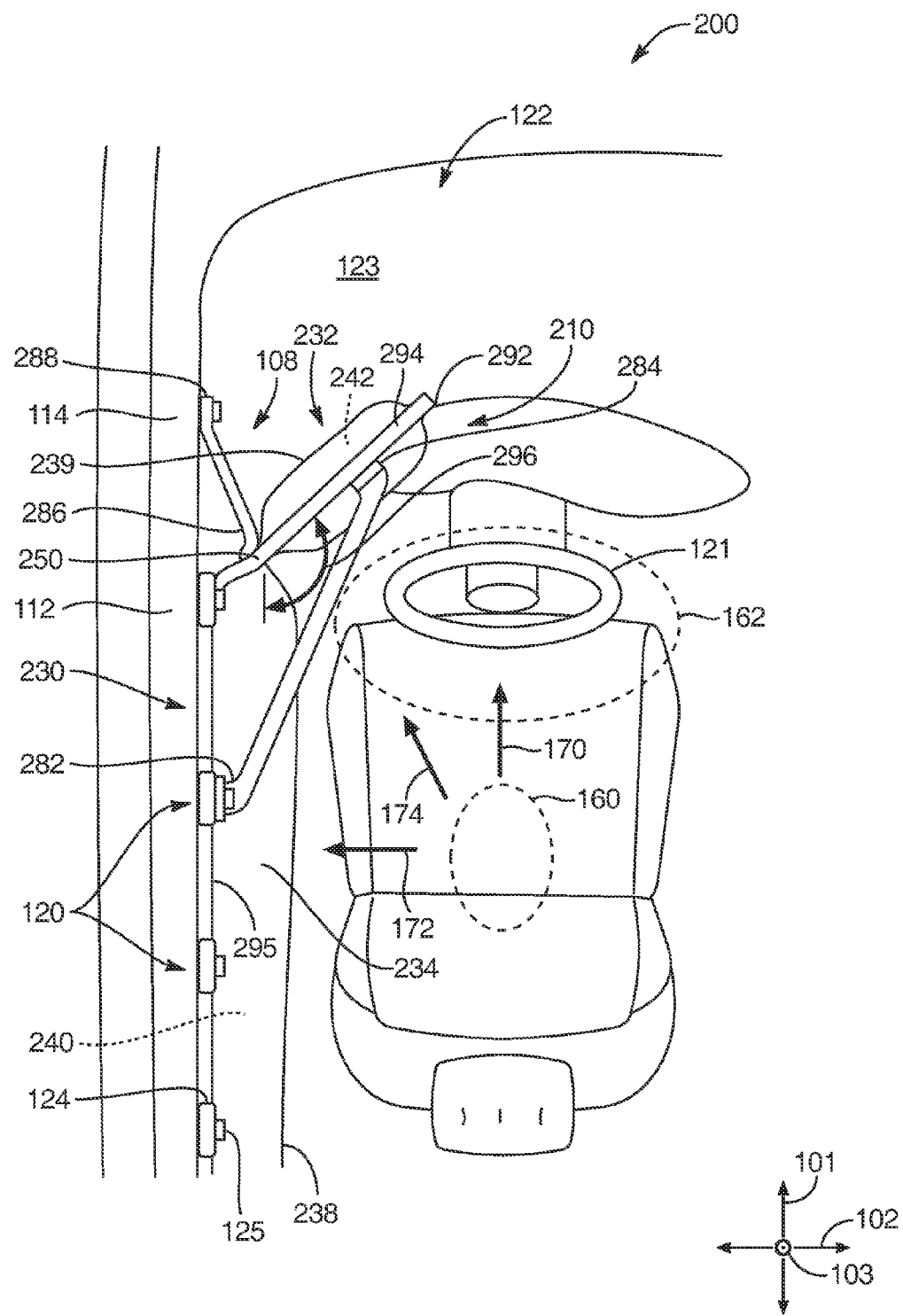
FIG. 7 is a top view of the airbag assembly of FIG. 4, wherein the inflatable curtain airbag is in the deployed configuration.

Referring to FIG. 7, a top view illustrates the airbag assembly 200 of FIG. 4, wherein the inflatable curtain airbag 210 is in the deployed configuration. As shown, the second protection zone 232 has unfolded from the first protection zone 230 to an extent limited by the tether 280. The second protection zone 232 may be positioned to block the gap between the first protection zone 230 and the position 162 of the driver's side airbag. The second protection zone 232 may thus be positioned generally between the occupant zone 160 of the occupant's head and the A-pillar 114 and the outboard portion 123 of the instrument panel 122, thereby providing protection from impact against these surfaces.

As shown, the inflatable curtain airbag 210 may remain folded at the chamber divider 250, which defines the natural fold line of the inflatable curtain airbag 210. As mentioned previously, the stowed fold line of the inflatable curtain airbag 210 may also be at the chamber divider 250, but in alternative embodiments, this need not be the case. A natural fold line at a different location from the chamber divider 250 may or may not affect the configuration of the deployed inflatable curtain airbag.

As shown in FIG. 7, the second protection zone 232 may unfold at an angle 296 relative to the first protection zone 230. The angle 296 may be determined by the length and attachment locations of the tether 280. The angle 296 may advantageously be less than 180°. The angle 296 may fall within the range of 110° to 160°. More precisely, the angle 296 may fall within the range of 120° to 150°. Yet more precisely, the angle 296 may fall within the range of 130° to 140°. Still more precisely, the angle 296 may be about 135°.

Figure 8:
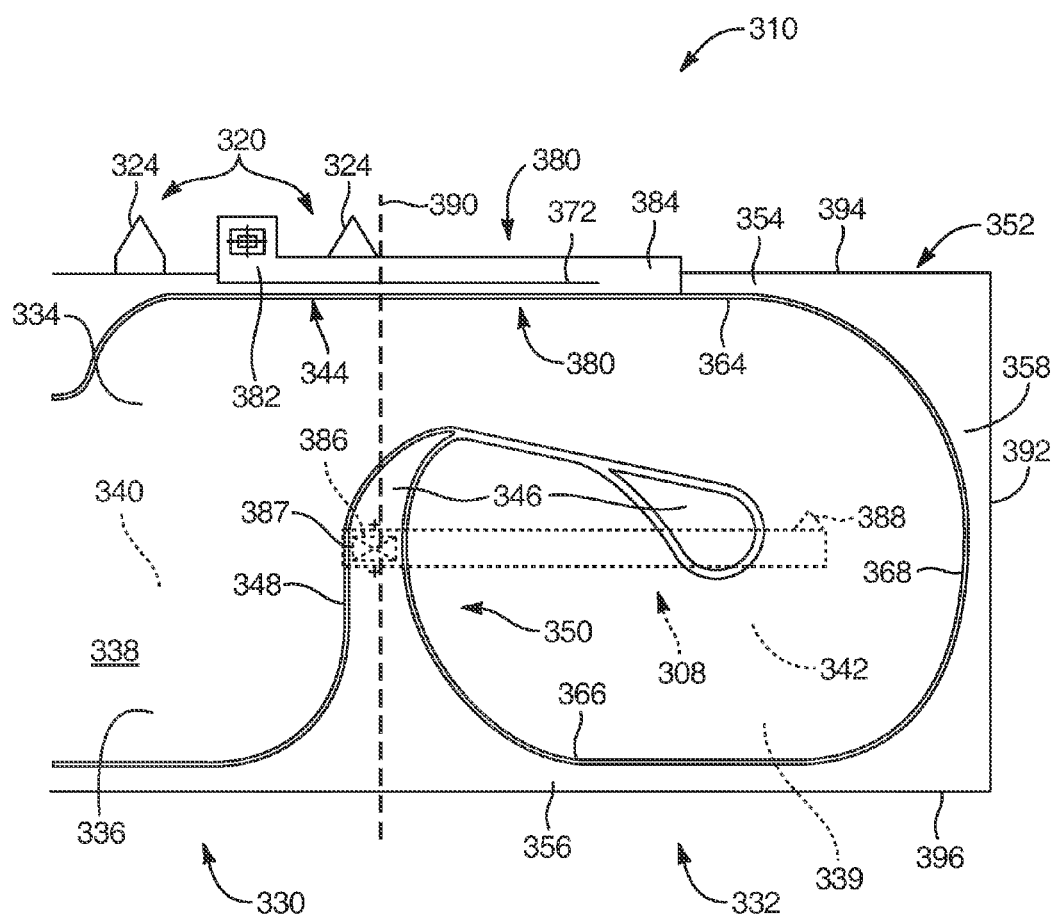
FIG. 8 is a side elevation view of the forward portion of an inflatable curtain airbag of an airbag assembly according to another alternative embodiment of the invention, prior to compaction of the inflatable curtain airbag into the stowed configuration.
Figure 8:
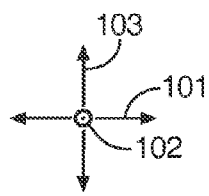

Referring to FIG. 8, a side elevation view illustrates the forward portion of an inflatable curtain airbag 310 of an airbag assembly according to one alternative embodiment of the invention, prior to compaction of the inflatable curtain airbag 310 into the stowed configuration. The inflatable curtain airbag 310 may have a plurality of mounting assemblies 320 arranged along its length to facilitate attachment of the inflatable curtain airbag 310 to the vehicle. Each of the mounting assemblies 320 may have a tab, and optionally, other components like those described in the description of the mounting assemblies 120. If desired, all of the mounting assemblies 320 may be secured rearward of the A-pillar 114.

Alternatively, one (i.e., the forward-most) of the mounting assemblies 320 may be secured to the A-pillar 114 adjacent to the roof rail 112.

Like the inflatable curtain airbag 210, the inflatable curtain airbag 310 may have a first protection zone 330 and a second protection zone 332 that unfolds forward of the first protection zone 330. The inflatable curtain airbag 310 may have an upper portion 334, a lower portion 336, an inboard section 338, and an outboard section 339 (facing away from the viewpoint of FIG. 8). The inboard section 338 and the outboard section 339 may constitute a first fabric layer and a second fabric layer, respectively. The inboard section 338 and the outboard section 339 may be secured together to define a first chamber 340 within the first protection zone 330 and a second chamber 342 within the second protection zone 332. The inboard section 338 and the outboard section 339 may be secured together at a peripheral seam, for example, through the use of peripheral stitching 344. Interior stitching 348 may also be applied interior to the peripheral stitching 344, and may define one or more non-inflating regions 346. The second protection zone 332 may have a forward edge 392, a top edge 394, a bottom edge 396, and a rearward edge (not shown).

The first protection zone 330 and the second protection zone 332 may be separated from each other by a chamber divider 350, which may be defined by a non-inflating region 346 extending generally along the transverse direction 103. The non-inflating region 346 may extend along a substantial portion of the height of the inflatable curtain airbag 310; accordingly, the non-inflating region 346 may define a deployed fold line about which the inflatable curtain airbag 310 may remain partially folded after deployment. A stowed fold line 390 may be positioned at the chamber divider 350 so that the stowed fold line 390 is the same as the deployed fold line defined by the chamber divider 350.

The inflatable curtain airbag 310 may be secured to the vehicle via a forward tether 308, which may have a first end 386 secure to the inflatable curtain airbag 310 proximate the chamber divider 350, for example, via stitching 387, and a second end 388 that can be secured to the A-pillar 114 of the vehicle. A restraint member in the form of a tether 380 may be used to control the angle to which the second protection zone 332 unfolds relative to the first protection zone 330 in a manner similar to that of the tether 280 of the previous embodiment. The tether 380 may thus have a first end 382 that can be secured to one of the mounting assemblies 320, such as the mounting assembly 320 that is the second forward-most mounting assembly (the leftward mounting assembly in FIG. 8) at an appropriate time prior to, during, or after compaction of the inflatable curtain airbag 310. The tether 380 may also have a second end 384.

The inflatable curtain airbag 310 may be distinct from the inflatable curtain airbag 210 in several respects. In the inflatable curtain airbag 310, the second chamber 342 may fill from proximate its upper end. Thus, inflation gas may flow into the second chamber 342 between the upper edge of the non-inflating region 346 of the chamber divider 350 and the peripheral stitching 344 proximate the top edge 394. The passageway permitting gas into the second chamber 342 may be fairly broad, thereby allowing the second protection zone 332 to inflate rapidly. The second protection zone 332 may inflate simultaneously with inflation of the first protection zone 330, or with only a short delay therebetween.

Furthermore, the non-inflating region 346 that defines the chamber divider 350 may be significantly broader along the longitudinal direction 101 than the chamber divider 250 of the previous embodiment. This may help the inflatable curtain airbag 310 to remain folded at the chamber divider 350 at the desired angle (such as the angle 296 shown in connection with the previous embodiment) during deployment because the first protection zone 330 and the second protection zone 332 may each have ample room to expand before the portion of the second protection zone 332 adjacent to the chamber divider 350 engages the corresponding portion of the first protection zone 330. Such engagement may urge the second protection zone 332 to an orientation parallel to the first protection zone 330. The breadth of the chamber divider 350 may act in concert with the tether 380 to help ensure that the second protection zone 332 is able to remain at the optimal position and/or angle relative to the first protection zone 330.

Yet further, the geometry of the peripheral stitching 344 proximate the bottom end of the chamber divider 350 may also facilitate deployment of the inflatable curtain airbag 310 with the desired angle between the second protection zone 332 and the first protection zone 330. The curvature of the peripheral stitching 344 proximate the bottom end of the chamber divider 350 may serve to widen the chamber divider 350 proximate the bottom end of the inflatable curtain airbag 310, and may help to alleviate the longitudinal tension present in the bottom portion of the chamber divider 350 during the deployment process. This may further allow the second protection zone 332 to remain at the proper angle relative to the first protection zone 330.

According to the present invention, material-sparing principles may be used to form a variety of airbag components from fabric that might otherwise be wasted to form airbag components. Some airbags are formed by sewing two sheets of fabric together. Typically, large sheets are used; each pair of sheets may be cut into multiple airbags. Since the airbags are not perfect rectangular shapes, there may be significant fabric between adjacent airbags that is wasted in the process.

The present disclosure provides a method whereby extra fabric, particularly that which is found at the periphery of an airbag, may be used to form airbag accessories that, conventionally, are made from separate fabric pieces. Such accessories may include tethers, reinforcement members, fabric shields, sail panels, attachment tabs, and a wide variety of other items that can be used to facilitate the installation and/or deployment of the airbag.

With reference to the embodiment of FIG. 8, the inflatable curtain airbag 310 may have a non-inflating peripheral region, or a peripheral region 352, positioned outside the peripheral stitching 344. The peripheral region 352 may lie on the opposite side of the peripheral stitching 344 from the first chamber 340 and the second chamber 342, and thus need not contain inflation gas. The inboard section 338 and the outboard section 339 may be secured together within the peripheral region 352, or may be left generally unattached in the peripheral region 352.

The peripheral region 352 may have a top portion 354, a bottom portion 356, a forward portion 358, and a rearward portion (not shown). The peripheral stitching 344 may also have a top portion 364, a bottom portion 366, a forward portion 368, and a rearward portion (not shown). The top portion 354 may lie generally above the top portion 364, the bottom portion 356 may lie generally beneath the bottom portion 366, and the forward portion 358 may lie generally forward of the forward portion 368. Similarly, the rearward portion of the peripheral region 352 may lie generally rearward of the rearward portion of the peripheral stitching 344.

The tether 380 may be cut from the fabric of the top portion 354 of the peripheral region 352. Thus, as shown, the tether 380 may be formed as a single piece with the top portion 354. The main body of the tether 380 may be separated from the remainder of the top portion 354 of the peripheral region 352 by a slit 372. The slit 372 may terminate short of the second end 384 of the tether 380 so that the top portion 354 of the peripheral region 352 remains joined to and unitary with the tether 380 at the second end 384.

The inflatable curtain airbag 310 may be formed by cutting or otherwise severing the material of the inboard section 338 and the outboard section 339 to define the edges of the inflatable curtain airbag 310, i.e., the forward edge 392, the top edge 394, the bottom edge 396, and the rearward edge (not shown). This process may define the profile of the inflatable curtain airbag 310. Then, the same or a different cutting or other severing process may be used to form the slit 372, thereby defining the tether 380 as distinct from the remainder of the top portion 354.

In alternative embodiments, either end of such a tether may optionally be reinforced through the attachment of a separate fabric piece (not shown) or via folding a portion of the tether over itself. For example, such a tether (not shown) may be formed with a double length or double width, and then folded back to overlie itself. This may be done before or after the formation of a slit to separate the tether from the peripheral region. Such a method may be applied to the entire length of the tether to reinforce the entire length, or optionally, to only either or both of the ends to reinforce the attachment points and/or stress concentrated areas. As another option, more rigid elements such as plates, fasteners, and the like may be applied to reinforce such a tether.

The principles applied to the inflatable curtain airbag 310 of FIG. 8 may be applied to a wide variety of airbag and tether configurations. For example, in addition or in the alternative to the use of a top tether integrated with the peripheral region, front and/or rear tethers designed to maintain tension in an inflatable curtain airbag may be formed as a single piece from excess fabric present at the edges of the inflatable curtain airbag.

Figure 9:
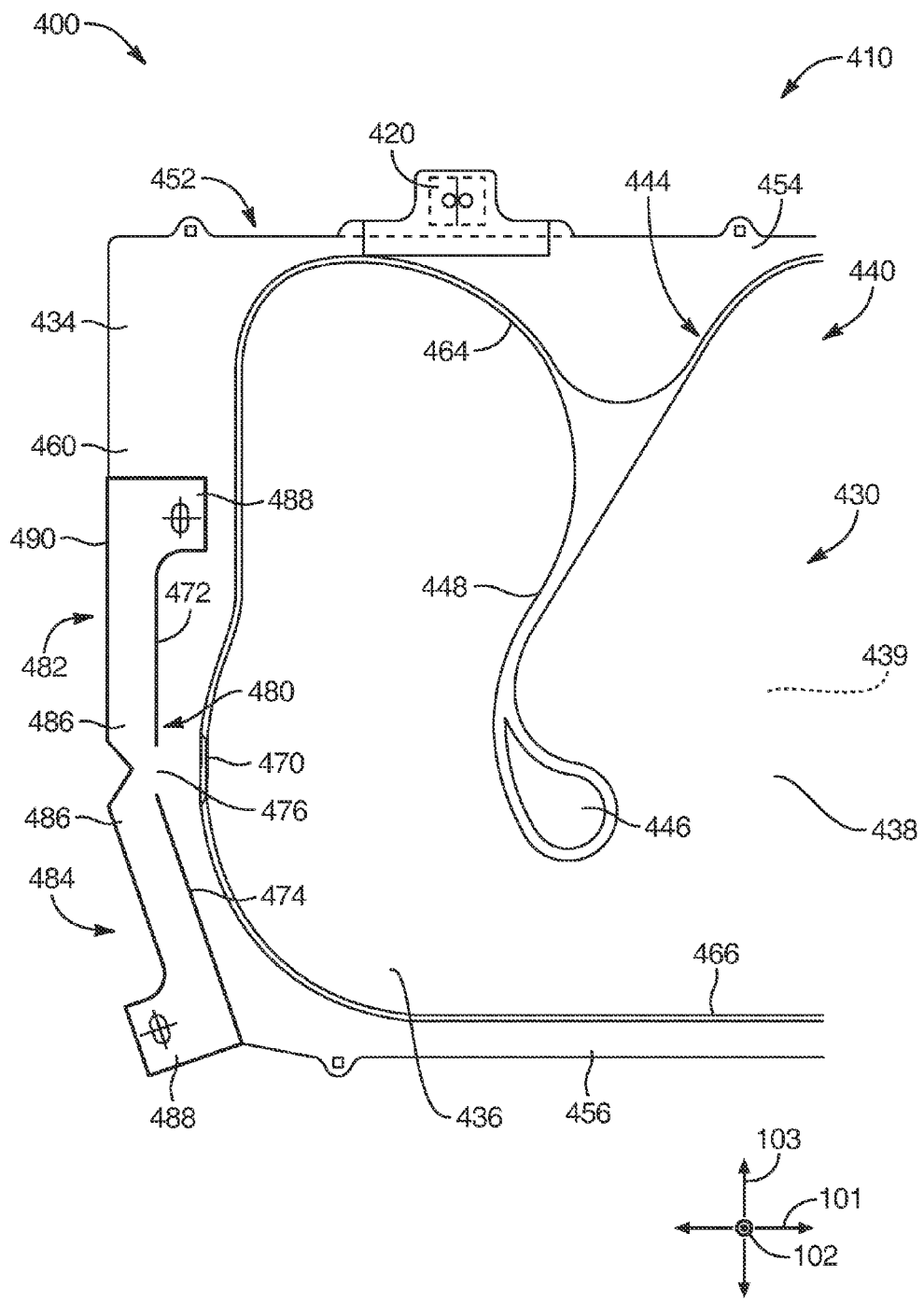
FIG. 9 is a side elevation view of the rearward portion of an inflatable curtain airbag of an airbag assembly according to another alternative embodiment of the invention.

Referring to FIG. 9, a side elevation view illustrates the rearward portion of an inflatable curtain airbag 410 of an airbag assembly 400 according to another alternative embodiment of the invention. As with previous embodiments, the inflatable curtain airbag 410 may be secured proximate the roof rail of a vehicle (not shown) to protect one or more vehicle occupants from impact against a lateral surface of the vehicle. The inflatable curtain airbag 410 may be secured to the vehicle through the use of a plurality of mounting assemblies 420.

The inflatable curtain airbag 410 may have at least a first protection zone 430 that inflates to provide the desired impact protection. The inflatable curtain airbag 410 may have an upper portion 434 and a lower portion 436. The inflatable curtain airbag 410 may be formed from first and second fabric layers, which may be an inboard section 438 and an outboard section 439. The inboard section 438 and the outboard section 439 may define a first chamber 440 within the first protection zone 430.

The first chamber 440 may be defined by a peripheral juncture that secures the inboard section 438 to the outboard section 439. The peripheral juncture may be formed with a wide variety of attachment methods and configurations including stitching, one-piece weaving, RF welding, ultrasonic welding, mechanical fastening, adhesive bonding, chemical bonding, or the like. In FIG. 9, the peripheral juncture may take the form of peripheral stitching 444 that generally encircles the periphery of the inflatable curtain airbag 410.

The inflatable curtain airbag 410 may also have one or more non-inflating regions 446 positioned within the space defined by the peripheral stitching 444. The non-inflating regions 446 may be defined by interior stitching 448 or alternatively, by a different form of attachment by which the inboard section 438 and the outboard section 439 are secured together within the space defined by the peripheral stitching 444.

The peripheral stitching 444 may also define a peripheral region 452 positioned outside the peripheral stitching 444. Within the peripheral region 452, the inboard section 438 and the outboard section 439 may be secured together, or may be left unattached. The peripheral region 452 may have a top portion 454, a bottom portion 456, a forward portion (not shown), and a rearward portion 460. The peripheral stitching 444 may similarly have a top portion 464, a bottom portion 466, a forward portion, and a rearward portion 470. The top portion 454 may be positioned generally above the top portion 464, the bottom portion 456 may be positioned generally below the bottom portion 466, and the rearward portion 460 may be positioned generally rearward of the rearward portion 470.

The airbag assembly 400 may also have a tether 480 that acts as a rear tether, which may cooperate with a front tether (not shown) to maintain tension on the inflatable curtain airbag 410 to keep the inflatable curtain airbag 410 in place after deployment. The tether 480 may be formed as a single piece with the inboard section 438 and the outboard section 439 that form the inflatable curtain airbag 410. More precisely, the tether 480 may be formed in the rearward portion 460 of the peripheral region 452 from excess fabric that is already present within the rearward portion 460.

The tether 480 may be formed from a first segment 482 and a second segment 484 that will ultimately be secured together to overlie each other. Each of the first segment 482 and the second segment 484 may have a first end 486 and a second end 488. The first end 486 of each of the first segment 482 and the second segment 484 may remain unitary with the rearward portion 460 of the peripheral region 452 and the second end 488 of each may be secured to the vehicle (not shown).

The inflatable curtain airbag 410 may be formed from larger sheets of fabric, which may be cut or otherwise severed from the remainder of the large sheets to define the inboard section 438 and the outboard section 439. The rearward portion 460 may have a rearward edge 490 that is cut or otherwise severed from the adjoining fabric to define the contour illustrated in FIG. 9, thus defining one side of each of the first segment 482 and the second segment 484. The other side of the first segment 482 may be defined by a first slit 472 and the other side of the second segment 484 may be defined by a second slit 474.

It may be desirable for the second end 488 of each of the first segment 482 and the second segment 484 to have an enlarged shape that facilitates attachment to the vehicle and/or provides a higher strength to compensate for the stress concentration that may exist if a hole is formed in the second end 488 to facilitate attachment. Since the enlarged shape of the second end 488 of the second segment 484 is defined by the contour of the rearward edge 490, the second slit 474 may extend in a substantially straight line with the angulation shown. The first slit 472 may extend in a combination of straight lines, curves, and angles to define the enlarged shape of the second end 488 of the first segment 482.

As they approach the first ends 486 of the first segment 482 and the second segment 484, the first slit 472 and the second slit 474 may terminate short of each other to leave a unsevered portion 476 by which the first segment 482 and the second segment 484 remain attached to and unitary with the rearward portion 460 of the peripheral region 452. The adjacent ends of the first slit 472 and the second slit 474 may be aligned vertically.

The first segment 482 and the second segment 484 may be formed from adjacent portions of the rearward portion 460 of the peripheral region 452, as shown. As mentioned previously, the first segment 482 and the second segment 484 may be folded to overlie each other. One manner in which this can be done will be shown and described in connection with FIGS. 10, 11, and 12, as follows.

Figure 10:
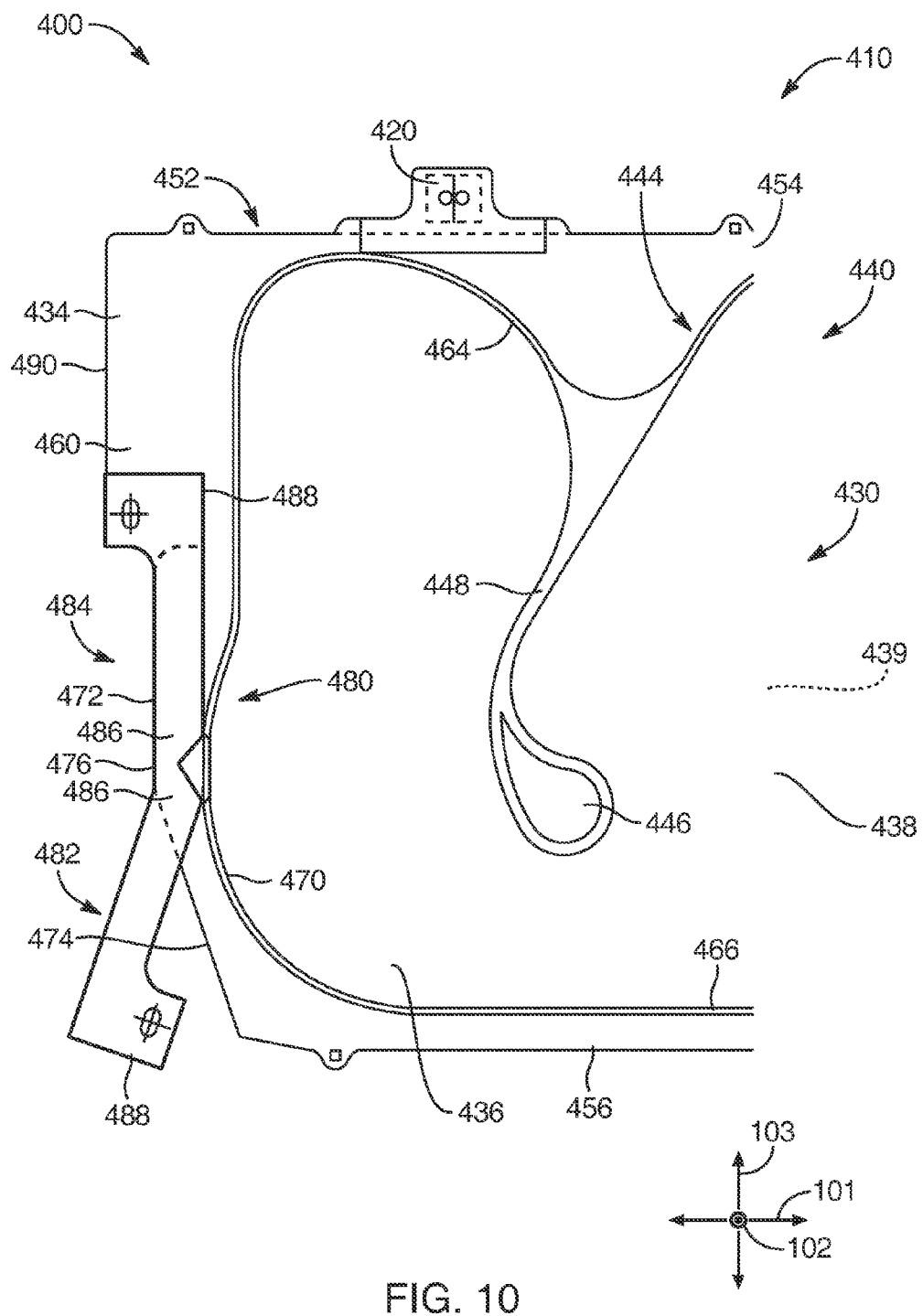
FIG. 10 is a side elevation view of the rearward portion of the inflatable curtain airbag of FIG. 9 after performance of a first folding step to form a tether.

Referring to FIG. 10, a side elevation view illustrates the rearward portion of the inflatable curtain airbag 410 of FIG. 9 after performance of a first folding step to form the tether 480. More specifically, after the first slit 472 and the second slit 474 have been formed, the first segment 482 and the second segment 484 may be attached to the remainder of the rearward portion 460 of the peripheral region 452 only at the unsevered portion 476.

As mentioned previously, the adjacent ends of the first slit 472 and the second slit 474 may be separated by a vertical offset, which may span the unsevered portion 476. The unsevered portion 476 may thus define a generally vertical fold line at which the first segment 482 and the second segment 484 may be folded forward to obtain the configuration shown in FIG. 10. The second segment 4842 may still extend generally vertically, but where the second end 488 of the first segment 482 was angled generally forward in FIG. 9, the second end 488 of the second segment 484 may be angled generally rearward in FIG. 10. During the folding process, the first segment 482 and the second segment 484 may pivot out of the page with respect to the view of FIG. 10.

The first segment 482 and the second segment 484 may now be ready for further folding operations. By these operations, the first segment 482 and the second segment 484 may be oriented generally horizontally, generally perpendicular to the rearward portion 460, the rearward portion 470, and the rearward edge 490.

Figure 11:
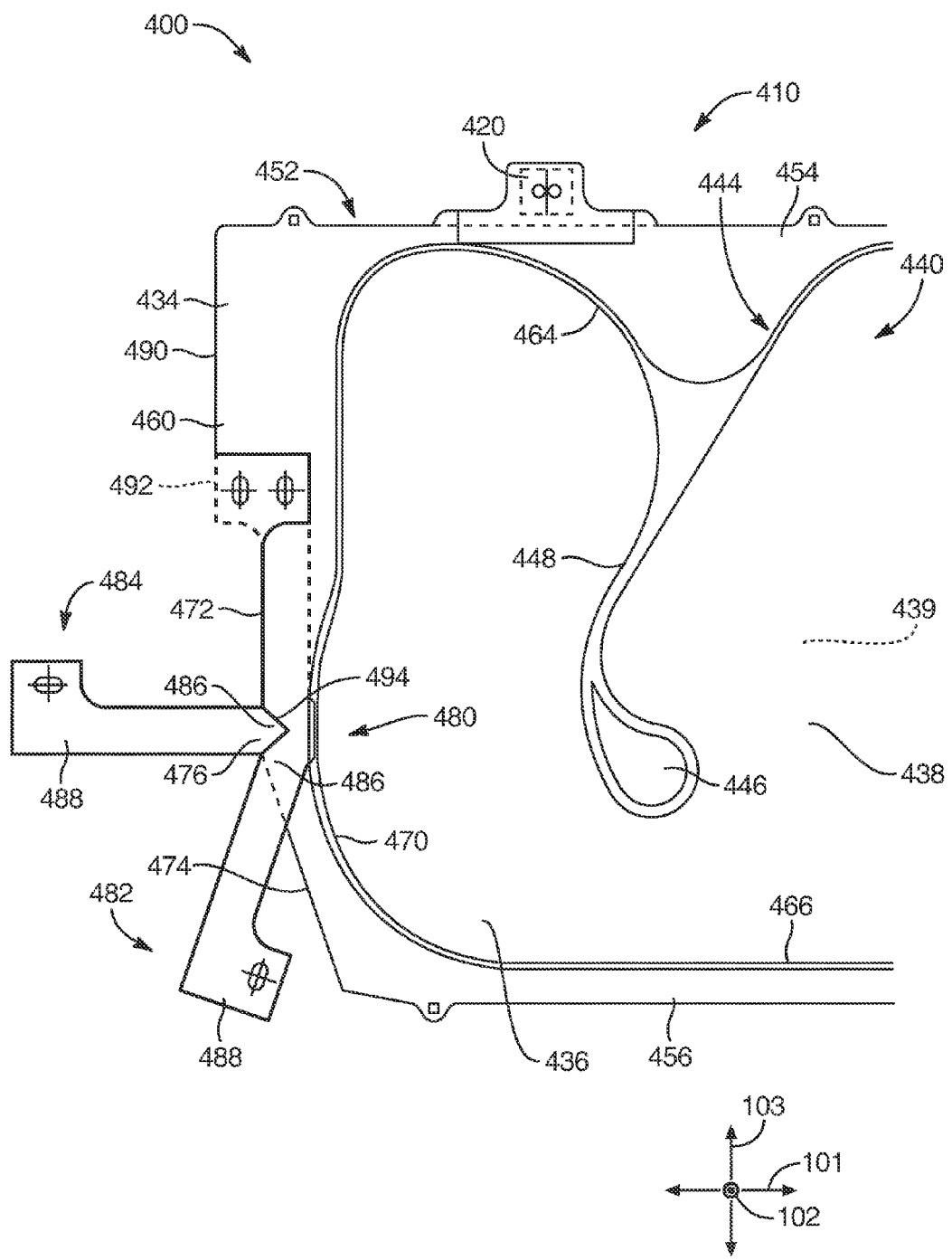
FIG. 11 is a side elevation view of the rearward portion of the inflatable curtain airbag of FIG. 9 after performance of a second folding step to form the tether.

Referring to FIG. 11, a side elevation view illustrates the rearward portion of the inflatable curtain airbag 410 of FIG. 9 after performance of a second folding step to form the tether 480. More specifically, the second segment 484 may be folded generally downward from a first previous position 492 to the position illustrated in FIG. 11. The second segment 484 may be folded at a first fold line 494 proximate the first end 486 of the first segment 482 to reach the position shown. The first fold line 494 may be angled about 45° from the horizontal; thus, folding the second segment 484 from a generally vertical orientation to a generally horizontal orientation. During the folding process, the second segment 484 may pivot out of the page with respect to the view of FIG. 11.

Figure 12:
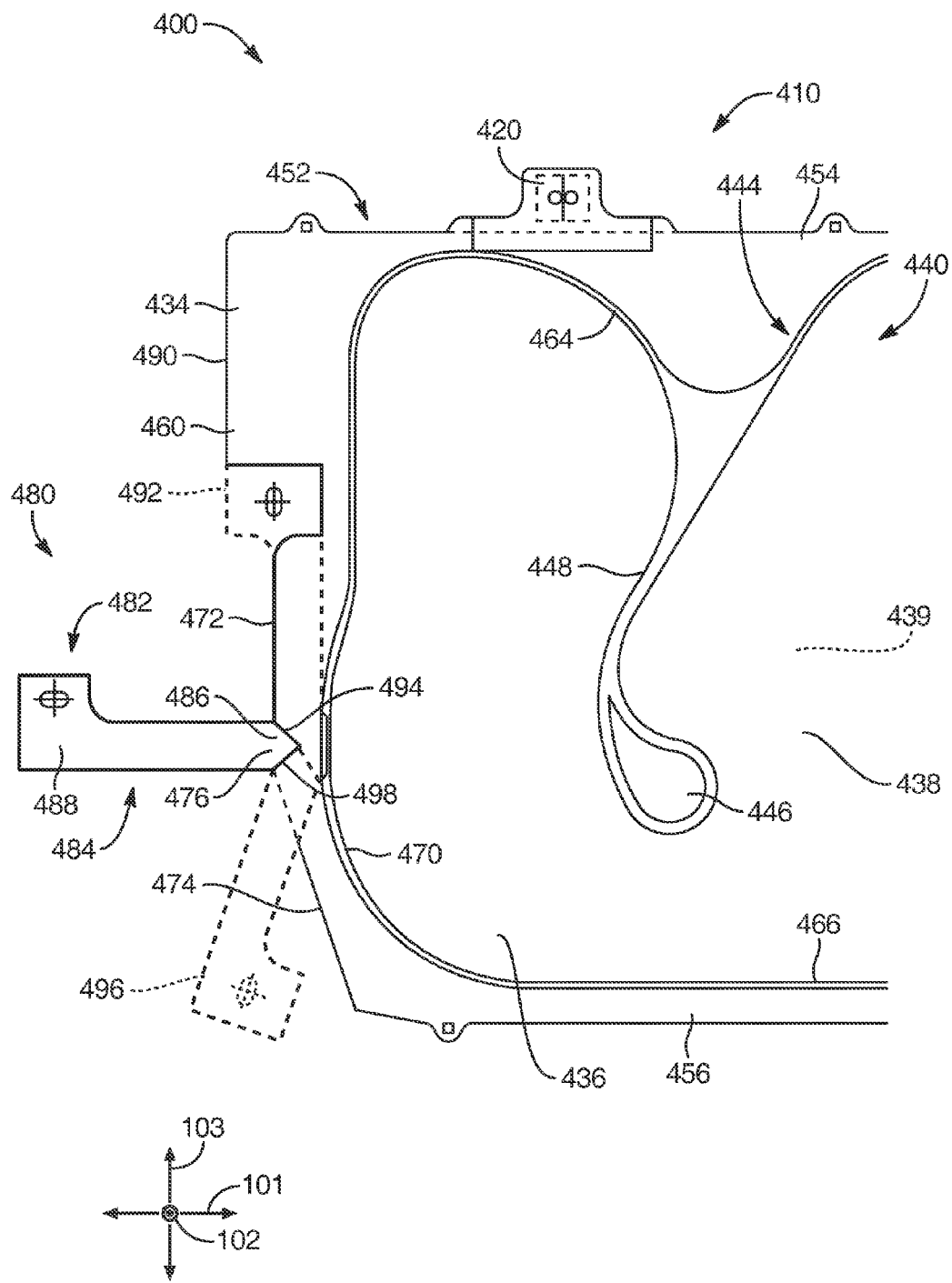
FIG. 12 is a side elevation view of the rearward portion of the inflatable curtain airbag of FIG. 9 after performance of a third folding step to form the tether.

Referring to FIG. 12, a side elevation view illustrates the rearward portion of the inflatable curtain airbag 410 of FIG. 9 after performance of a third folding step to form the tether 480. As shown, the first segment 482 may be folded generally upward from a second previous position 496 to the position illustrated in FIG. 12. The first segment 482 may be folded at a second fold line 498 proximate the first end 486 of the first segment 482 to reach the position shown. The second fold line 498 may be angled a little less than 45° from the horizontal; thus, folding the first segment 482 from a generally vertical orientation (with the slight rearward angulation indicated by the second previous position 496) to a generally horizontal orientation. During the folding process, the first segment 482 may pivot out of the page with respect to the view of FIG. 12.

Once this third folding operation is complete, the second segment 484 may overlie the first segment 482. The tether 480 may include the first segment 482 and the second segment 484. Each of the first segment 482 and the second segment 484 may have a first fabric layer and a second fabric layer. The first and second fabric layers may be unitarily formed with the inboard section 438 and the outboard section 439, respectively. Thus, the tether 480 may have four layers after the step of FIG. 12.

This double-tether, quadruple-layer arrangement may be advantageous because the tether 480 may carry a significant tensile stress when the inflatable curtain airbag 410 deploys. Accordingly, the tether 480 may require more than two layers (i.e., the inboard section 438 and the outboard section 439) to reliably bear the stresses of deployment. Formation of the first segment 482 and the second segment 484 from the rearward portion 460 of the peripheral region 452 may enable the creation of the tether 480 with a high strength, without requiring any fabric beyond that which is already used to form the inflatable curtain airbag 410 and may otherwise be wasted.

To further enhance the ability of the tether 480 to resist the stresses of deployment, it may be helpful to reinforce the tether 480. Specifically, additional fabric layers may optionally be added to the portions of the tether 480 that are subject to the largest stress. This may entail reinforcing the first end 486 and/or the second end 488 of the tether 480. Exemplary reinforcement of the first end 486 will be shown and described in connection with FIG. 13, as follows.

Figure 13:
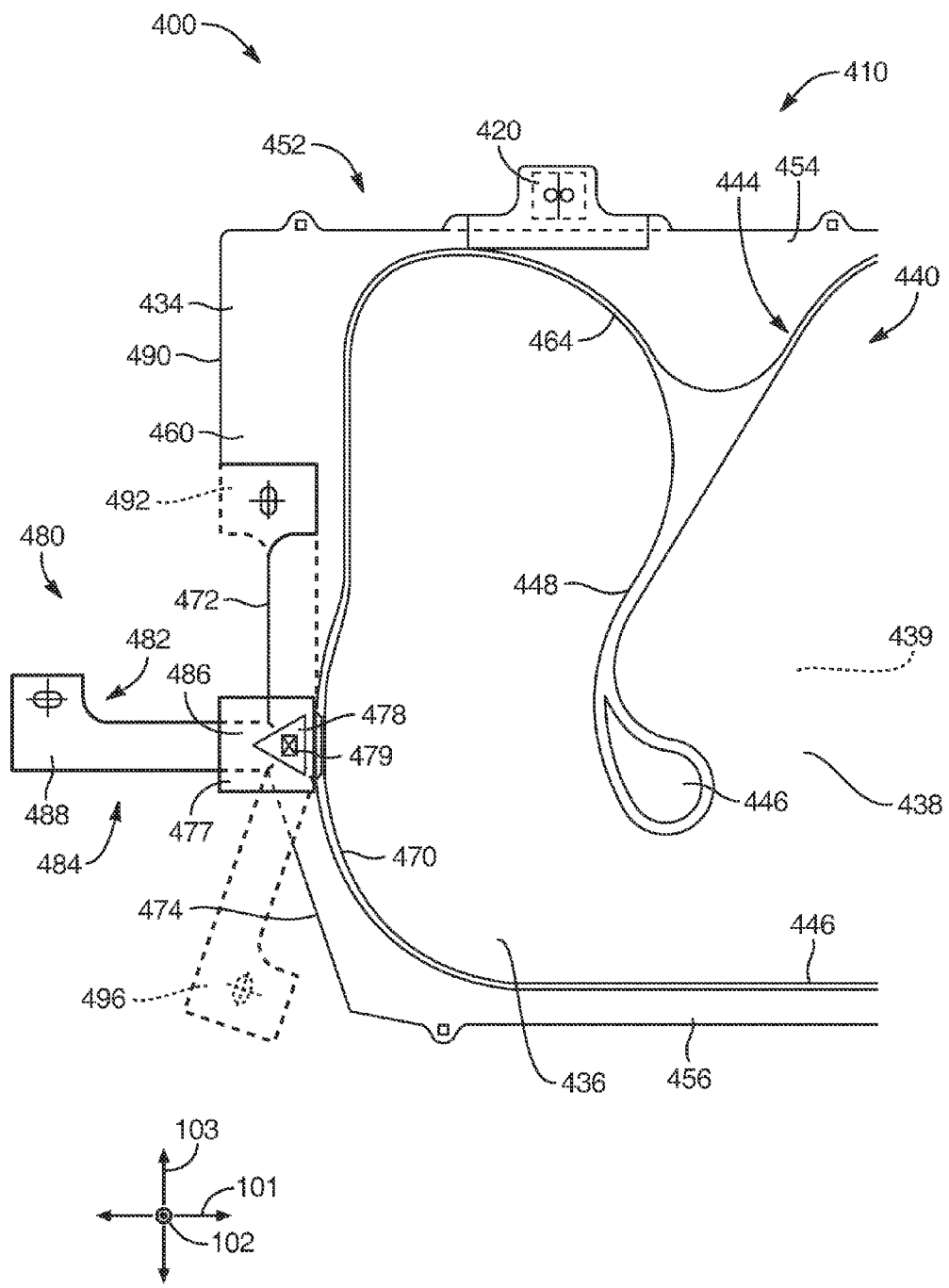
FIG. 13 is a side elevation view of the rearward portion of the inflatable curtain airbag of FIG. 9 after reinforcement of the first end of the tether.

Referring to FIG. 13, a side elevation view illustrates the rearward portion of the inflatable curtain airbag of FIG. 9 after reinforcement of the first end 486 of the tether 480. The first end 486 may represent a stress riser where the first end 486 joins the rearward portion 460 of the peripheral region 452. Accordingly, it may be advisable to reinforce this junction to help prevent tearing.

As shown, a first reinforcement panel 477 may be applied to the first end 486. The first reinforcement panel 477 may have a generally square shape as illustrated, or any other shape. The first reinforcement panel 477 may be severed from a part of the peripheral region 452. Accordingly, the first reinforcement panel 477 may optionally have two or more layers.

A second reinforcement panel 478 may also be applied to the first end 486. In FIG. 13, the second reinforcement panel 478 is illustrated with a triangular shape, but this is merely exemplary. The first reinforcement panel 477 may be sandwiched between the first end 486 and the second reinforcement panel 478. The second reinforcement panel 478 may also have two or more layers.

The first reinforcement panel 477 and the second reinforcement panel 478 may be secured to the first end 486 through the use of a wide variety of methods including stitching, one piece weaving, RF welding, ultrasonic welding, chemical bonding, adhesive bonding, mechanical fastening, or the like. In FIG. 13, the first reinforcement panel 477, the second reinforcement panel 478, and the first end 486 are secured together through the use of stitching 479. The first reinforcement panel 477 and the second reinforcement panel 478 may help avoid tearing or stretching of the unsevered portion 476 by which the first end 486 joins the rearward portion 460 of the peripheral region 452.

The airbag assembly 300 and the airbag assembly 400 present examples whereby the material-sparing principles of the present disclosure may be applied to various types of tethers. This disclosure may additionally or alternatively be used to provide other types of airbag accessories. One such example will be shown and described in connection with FIG. 14.

Figure 14:
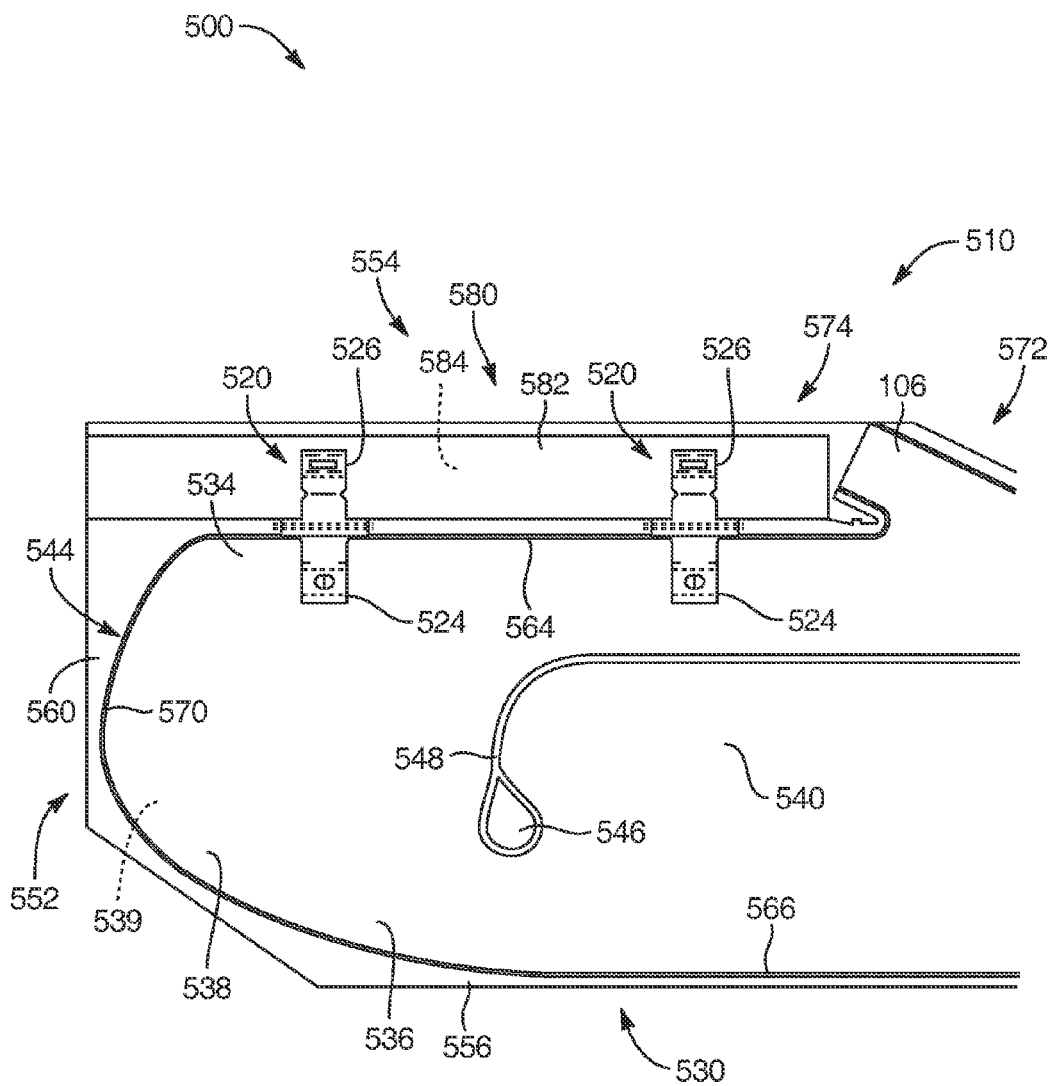
FIG. 14 is a side elevation view of the rearward portion of an inflatable curtain airbag of an airbag assembly according to another alternative embodiment of the invention.

Referring to FIG. 14, a side elevation view illustrates the rearward portion of an inflatable curtain airbag 510 of an airbag assembly 500 according to another alternative embodiment of the disclosure. As with previous embodiments, the inflatable curtain airbag 510 may be secured proximate the roof rail of a vehicle (not shown) to protect one or more vehicle occupants from impact against a lateral surface of the vehicle.

The inflatable curtain airbag 510 may be secured to the vehicle through the use of a plurality of mounting assemblies 520. Each of the mounting assemblies 520 may have a tab 524 that facilitates attachment of the inflatable curtain airbag 510 to the vehicle, and a wrapper 526 that wraps around the inflatable curtain airbag 510 to keep the inflatable curtain airbag 510 in the stowed configuration. The mounting assemblies 520 may be formed from separate pieces of flexible material such as fabric and/or polymer sheets. The wrappers 526 may be tab-like elements as shown in FIG. 14, or may be broader so that they cover a larger portion of the length of the inflatable curtain airbag 510. In alternative embodiments (not shown), a single mounting assembly may be used, and may have a single wrapper that extends the entire length, or nearly the entire length, of the inflatable curtain airbag 510, with multiple tabs attached to the wrapper for vehicle attachment. Many alternative mounting assemblies may be used within the scope of the present invention.

The inflatable curtain airbag 510 may have at least a first protection zone 530 that inflates to provide the desired impact protection. The inflatable curtain airbag 510 may have an upper portion 534 and a lower portion 536. The inflatable curtain airbag 510 may be formed from first and second fabric layers, which may be an inboard section 538 and an outboard section 539. The inboard section 538 and the outboard section 539 may define a first chamber 540 within the first protection zone 530.

The first chamber 540 may be defined by a peripheral juncture that secures the inboard section 538 to the outboard section 539. The peripheral juncture may be formed with a wide variety of attachment methods and configurations including stitching, one-piece weaving, RF welding, ultrasonic welding, mechanical fastening, adhesive bonding, chemical bonding, or the like. In FIG. 14, the peripheral juncture may take the form of peripheral stitching 544 that generally encircles the periphery of the inflatable curtain airbag 510.

The inflatable curtain airbag 510 may also have one or more non-inflating regions 546 positioned within the space defined by the peripheral stitching 544. The non-inflating regions 546 may be defined by interior stitching 548 or alternatively, by a different form of attachment by which the inboard section 538 and the outboard section 539 are secured together within the space defined by the peripheral stitching 544.

The peripheral stitching 544 may also define a peripheral region 552 positioned outside the peripheral stitching 544. Within the peripheral region 552, the inboard section 538 and the outboard section 539 may be secured together, or may be left unattached. The peripheral region 552 may have a top portion 554, a bottom portion 556, a forward portion (not shown), and a rearward portion 560. The peripheral stitching 544 may similarly have a top portion 564, a bottom portion 566, a forward portion, and a rearward portion 570. The top portion 554 may be positioned generally above the top portion 564, the bottom portion 556 may be positioned generally below the bottom portion 566, and the rearward portion 560 may be positioned generally rearward of the rearward portion 570.

The top portion 554 of the peripheral region 552 may have an inflation conduit that conveys inflation gas from an inflator, such as the inflator 104 of FIG. 1, into the inflatable curtain airbag 510. The inflation conduit may take the form of a tube 106 like that of the airbag assembly 100 of FIG. 1. The tube 106 may extend through the top portion 554 of the peripheral region 552, and may separate the top portion 554 into a forward section 572 in front of the tube 106 and a rearward section 574 rearward of the tube 106.

In many airbag designs, the portions of the peripheral region that lie forward and rearward of the inflation conduit constitute wasted material. In the airbag assembly 500 of FIG. 14, the rearward section 574 may be put to use to define a fabric shield 580 that covers the inflatable curtain airbag 510 in the stowed configuration to protect the inflatable curtain airbag 510 from deployment-related events such as tearing or snagging on objects near the roof rail within the interior of the vehicle. Such objects may include trim, trim fasteners, occupant baggage, and the like. The fabric shield 580 may help prevent the inflatable curtain airbag 510 from damage related to impingement against such objects during deployment.

In alternative embodiments (not shown), if desired, an inflatable curtain airbag may have forward and rearward sections of a top portion of a peripheral region, forward and rearward of an inflation conduit, that are both used to form fabric shields. Alternatively, only one of the sections (e.g., only the forward section) may be used to form the fabric shield. In yet other alternative embodiments of the disclosure (not shown), other non-inflating airbag regions may be used to form fabric shields to protect the inflatable curtain airbag during inflation.

Returning to the embodiment of FIG. 14, the fabric shield 580 may include a first fabric layer 582 and a second fabric layer 584. The first fabric layer 582 may be integrally formed with the inboard section 538, and may even be the portion of the inboard section 538 that extends above the top portion 564 of the peripheral stitching 544. Similarly, the second fabric layer 584 may be integrally formed with the outboard section 539, and may even be the portion of the outboard section 539 that extends above the top portion 564 of the peripheral stitching 544. The first fabric layer 582 and the second fabric layer 584 may be wrapped around the inflatable curtain airbag 510 interior to the wrapper 526 as will be shown and described in conjunction with FIGS. 15-18, as follows.

Figure 15:
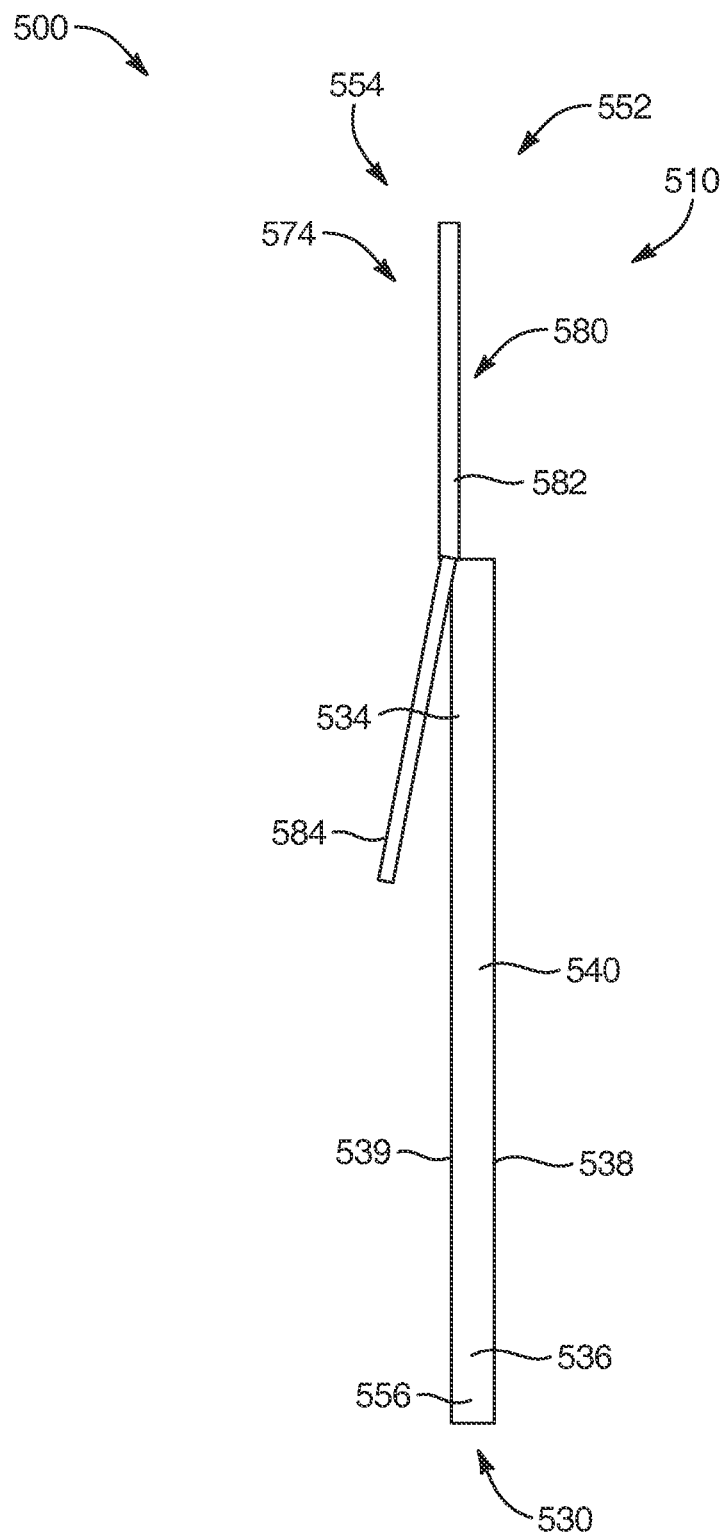
FIG. 15 is a forward view of the inflatable curtain airbag of FIG. 14 after performance of a first folding step to form the fabric shield.

Referring to FIG. 15, a forward view illustrates the airbag assembly 500 of FIG. 14 after performance of a first folding step to form the fabric shield 580. The fabric shield 580 may be folded prior to compaction of the inflatable curtain airbag 510 into the stowed configuration.

As shown, the second fabric layer 584 may be separated from the first fabric layer 582 and folded downward against the remainder of the outboard section 539 of the inflatable curtain airbag 510. This may be done prior to attachment of the mounting assemblies 520 to the inflatable curtain airbag 510. Accordingly, the mounting assemblies 520 are not shown in FIG. 15.

Figure 16:
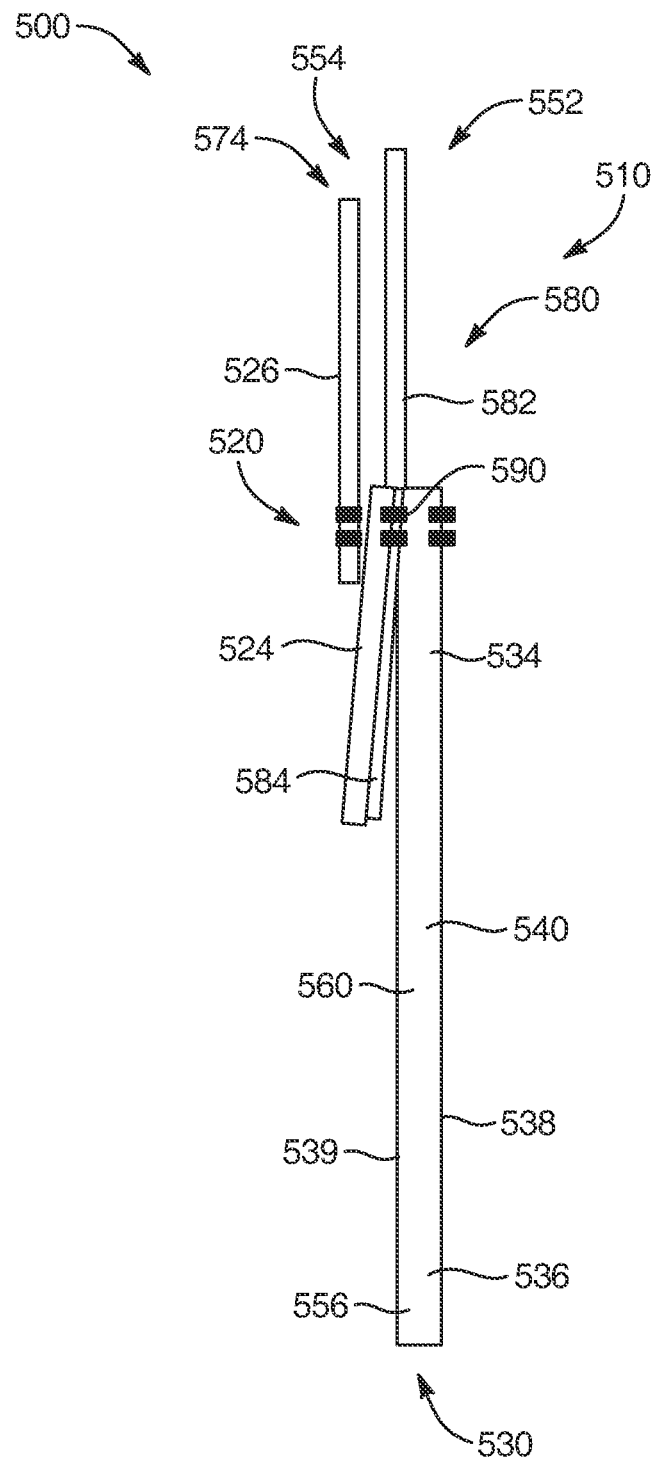
FIG. 16 is a forward view of the inflatable curtain airbag of FIG. 14 after attachment of a mounting assembly to the inflatable curtain airbag.

Referring to FIG. 16, a forward view illustrates the airbag assembly 500 of FIG. 14 after attachment of the mounting assemblies 520 to the inflatable curtain airbag. The mounting assemblies 520 may be secured to the inflatable curtain airbag 510 through any of a variety of methods known in the art, including one-piece weaving, ultrasonic welding, RF welding, sewing, adhesive bonding, chemical bonding, and the like.

As shown in FIG. 16, the mounting assemblies 520 may be attached to the inflatable curtain airbag 510 in or proximate the top portion 554 of the peripheral region 552 via stitching 590. The stitching 590 may optionally be applied through the inboard section 538, the outboard section 539, the tab 524, and then the wrapper 526, as shown. The tab 524 may initially be oriented downward to lay against the second fabric layer 584, which was folded downward in the previous step. The wrapper 526 may initially be positioned to extend upward, parallel to the first fabric layer 582.

Figure 17:
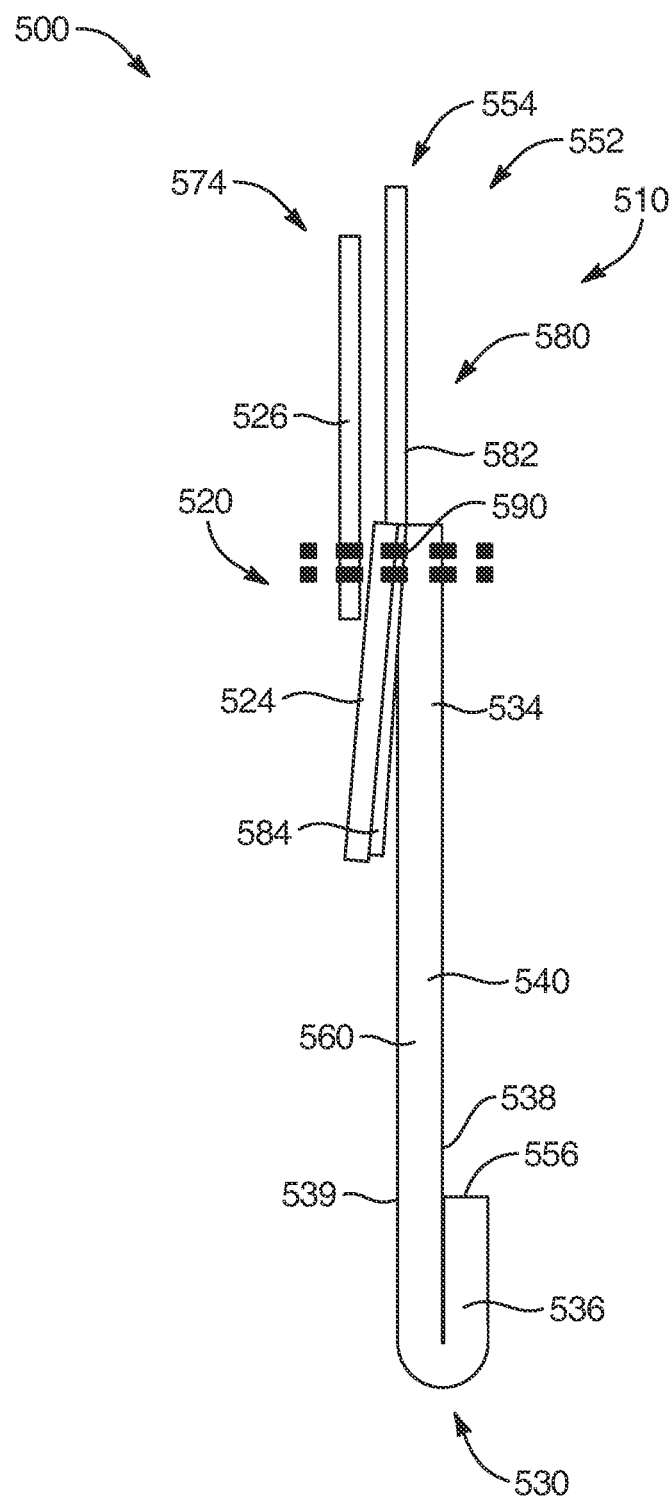
FIG. 17 is a forward view of the inflatable curtain airbag of FIG. 14 after commencement of compaction of the inflatable curtain airbag.

Referring to FIG. 17, a forward view illustrates the airbag assembly 500 of FIG. 14 after commencement of compaction of the inflatable curtain airbag 510. The inflatable curtain airbag 510 may be compacted in any of a wide variety of ways, including rolling, folding, wadding, and the like. As shown in FIG. 17, the inflatable curtain airbag 510 may be rolled inboard. Thus, the bottom portion 556 may first be folded inboard as shown, followed shortly by the lower portion 536 of the first chamber 540. The inflatable curtain airbag 510 may be rolled until the entirety of the inflatable curtain airbag 510 is compacted proximate the first fabric layer 582, the second fabric layer 584, and the mounting assemblies 520.

Figure 18:
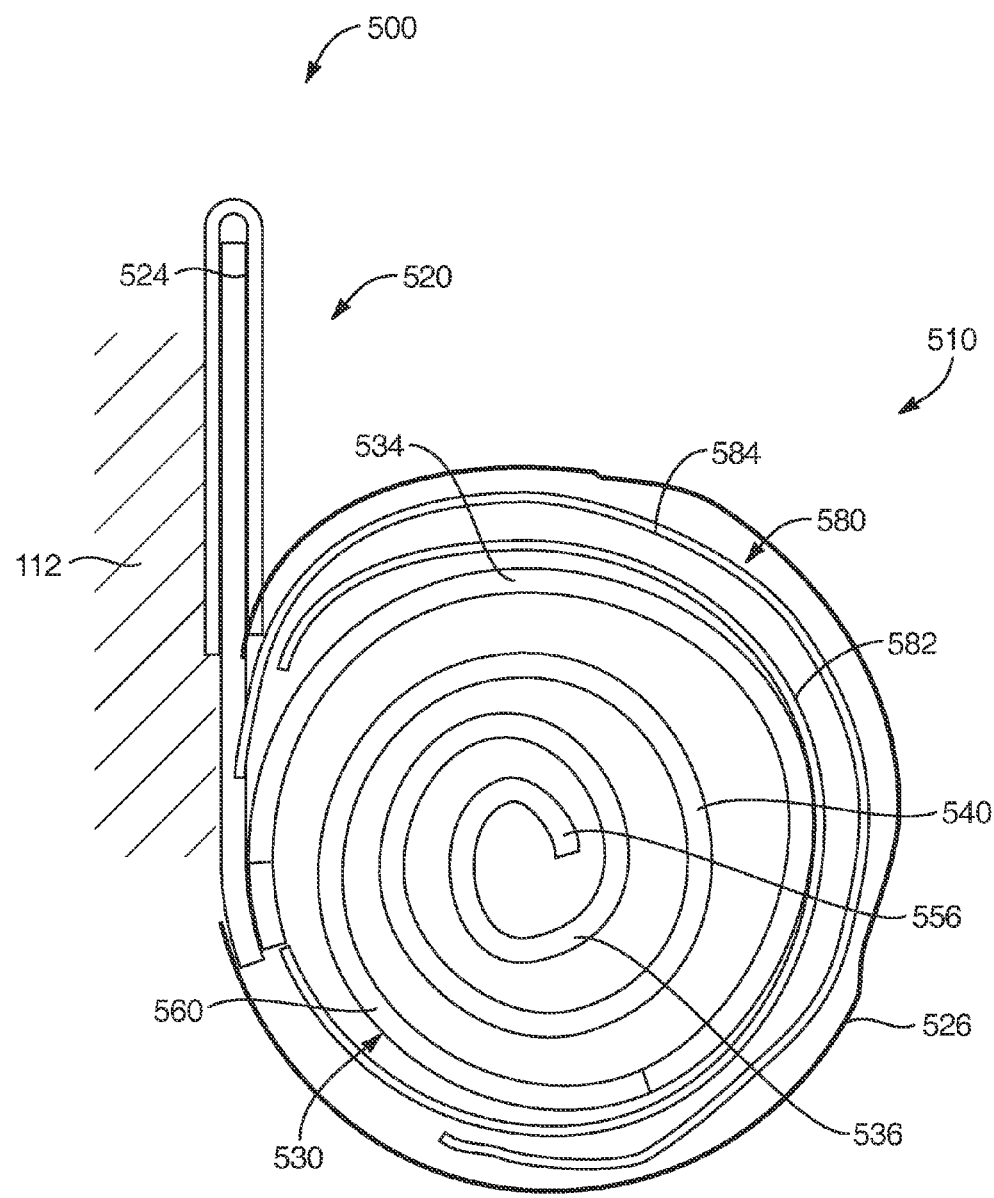
FIG. 18 is a rear view of the inflatable curtain airbag of FIG. 14 after completion of compaction of the inflatable curtain airbag and attachment of the inflatable curtain airbag to a vehicle.

Referring to FIG. 18, a rear view illustrates the airbag assembly 500 of FIG. 14 after completion of compaction of the inflatable curtain airbag 510 and attachment of the inflatable curtain airbag 510 to the roof rail 112 of a vehicle. Several steps may occur to bring the airbag assembly 500 from the configuration of FIG. 17 to that of FIG. 18.

More specifically, the entirety of the inflatable curtain airbag 510 may be rolled and positioned proximate and generally between the first fabric layer 582 and the second fabric layer 584. The first fabric layer 582 and the second fabric layer 584 may be brought inboard to wrap around the inflatable curtain airbag 510. As shown in FIG. 18, the first fabric layer 582 may first be brought around the inflatable curtain airbag 510 so that the first fabric layer 582 mostly or fully encircles the inflatable curtain airbag 510. Then, the second fabric layer 584 may be brought around the inflatable curtain airbag 510 so that the second fabric layer 584 mostly or fully encircles the inflatable curtain airbag 510 and the first fabric layer 582. In alternative embodiments, the order in which the first fabric layer 582 and the second fabric layer 584 are wrapped around the inflatable curtain airbag 510 may be altered.

Once the fabric shield 580 is in place, i.e., the first fabric layer 582 and the second fabric layer 584 have been wrapped around the inflatable curtain airbag 510, the wrapper 526 may then be wrapped around the inflatable curtain airbag 510 and the fabric shield 580. The free end of the wrapper 526 may then be attached to the inflatable curtain airbag 510 and/or the tab 524. As shown in FIG. 18, the free end of the wrapper 526 may be attached to the tab 524 so that the wrapper 526 retains the inflatable curtain airbag 510 and the fabric shield 580 in the stowed configuration. The airbag assembly 500 may now be in the stowed configuration, ready for installation in the vehicle.

Prior to installation in the vehicle, the airbag assembly 500 may be flipped end-over-end 180° such that the tab 524 extends upward rather than downward. Accordingly, FIG. 18 may represent a rear view of the airbag assembly 500 while FIG. 15, FIG. 16, and FIG. 17 represent forward views of the airbag assembly. Once properly oriented, the airbag assembly 500 may be secured to the vehicle by securing the tabs 524 to the roof rail 112. This may be done in a variety of way including through the use of fasteners or other attachment methods known in the art. The airbag assembly 500 may now be ready to deploy to provide impact protection.

Figure 19:
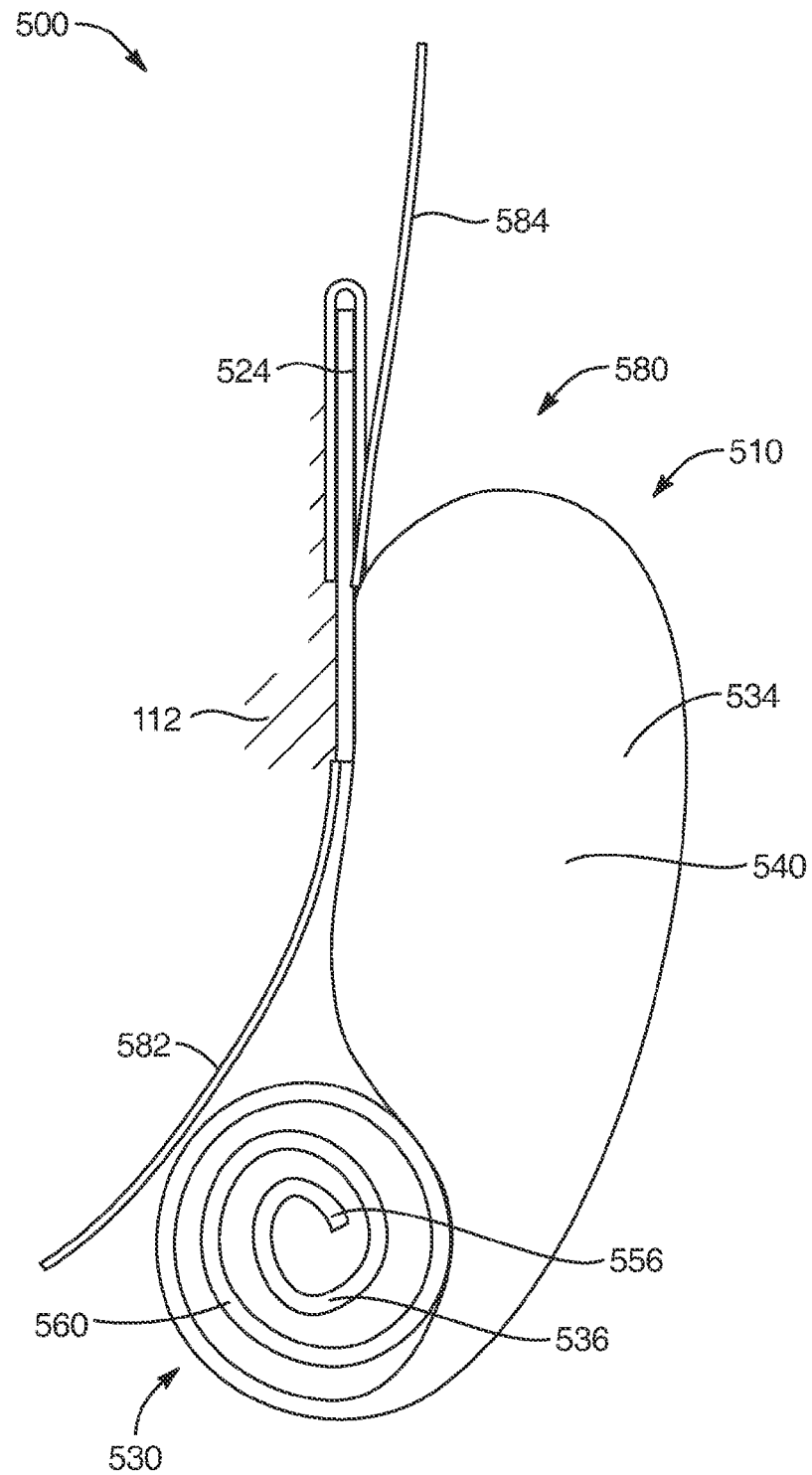
FIG. 19 is a rear view of the inflatable curtain airbag of FIG. 14 during deployment of the inflatable curtain airbag.

FIG. 19 is a rear view of the airbag assembly 500 of FIG. 14 during deployment of the inflatable curtain airbag 510. Upon detection of a collision, rollover, impending collision, or impending rollover, the inflator 104 may produce inflation gas, which may be conveyed into the inflatable curtain airbag 510 through the tube 106. The inflation gas may cause the inflatable curtain airbag 510 to expand, starting with the upper portion 534 of the inflatable curtain airbag 510. This expansion may rupture the wrapper 526 and/or detach the wrapper 526 from its attachment to the inflatable curtain airbag 510 and/or the tab 524. The wrapper 526 is not shown in FIG. 19 for clarity.

The expanding inflatable curtain airbag 510 may cause the first fabric layer 582 and the second fabric layer 584 to spread open. More precisely, the second fabric layer 584 may extend upward to protect the inflatable curtain airbag 510 from objects above the inflatable curtain airbag 510, such as fastener components used to attach the tabs 524 to the roof rail 112, headliner trim fasteners, and the like. The first fabric layer 582 may extend downward to protect the inflatable curtain airbag 510 from objects behind and/or below the inflatable curtain airbag 510, such as the roof rail trim and fasteners, clothing hooks, seat belt anchors, occupant possessions, and/or other interior features of the vehicle.

From the configuration of FIG. 19, the inflatable curtain airbag 510 may continue expanding downward until it is fully inflated and properly positioned to protect vehicle occupants form lateral impact, small overlap, and/or rollover collisions. The fabric shield 580 may help avoid damage to the inflatable curtain airbag 510 during deployment, and may accomplish this through the use of the material of the peripheral region 552 of the inflatable curtain airbag 510, which might otherwise have been waste material. Accordingly, the fabric shield 580 may contribute to the economy and effectiveness of airbag systems.

The airbag assembly 500 presents an example whereby the material-sparing principles of the present disclosure may be applied to a shield that protects and inflatable curtain airbag during deployment. This disclosure may additionally or alternatively be used to enhance the operation of airbag assemblies in other ways, such as by providing additional inflatable volume to ensure that an airbag is optimally positioned. One such example will be shown and described in connection with FIGS. 20 and 21, in the context of providing desired positioning for a forward chamber for an inflatable curtain airbag.

Figure 20:
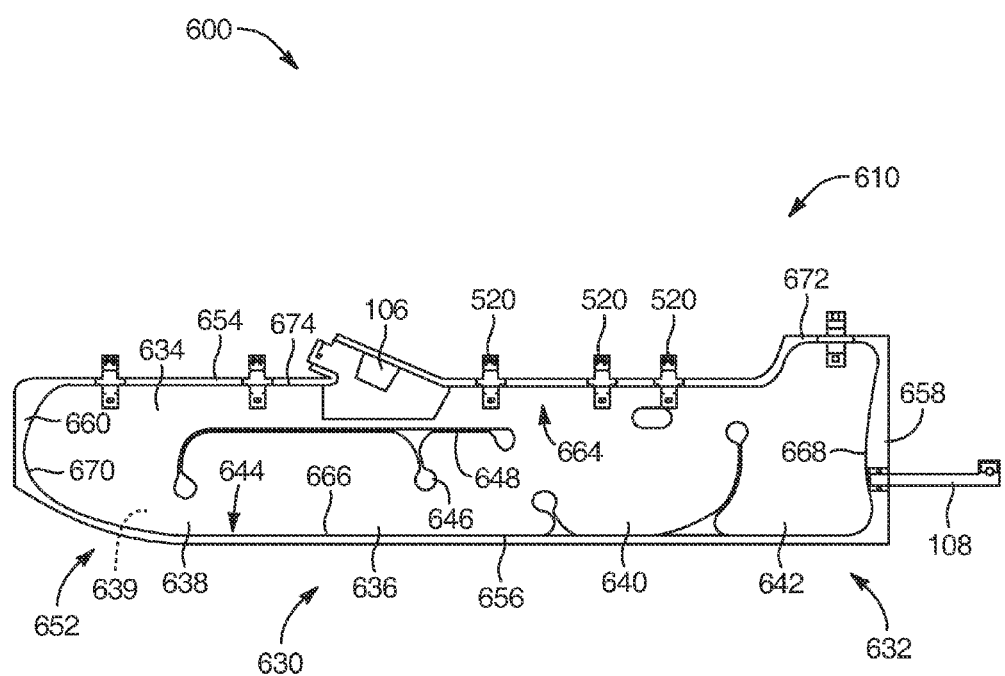
FIG. 20 is a side elevation view of an inflatable curtain airbag of an airbag assembly according to another alternative embodiment of the invention.

Referring to FIG. 20, a side elevation view illustrates an inflatable curtain airbag 610 of an airbag assembly 600 according to another alternative embodiment of the invention. As with previous embodiments, the inflatable curtain airbag 610 may be secured proximate the roof rail of a vehicle (not shown) to protect one or more vehicle occupants from impact against a lateral surface of the vehicle.

The inflatable curtain airbag 610 may be secured to the vehicle through the use of a plurality of mounting assemblies 520, which may be the same as or similar to the mounting assemblies 520 of the airbag assembly 500 of FIGS. 14-19. The inflatable curtain airbag 610 may have a first protection zone 630 and a second protection zone 632 that inflates forward of the first protection zone 630 such that the first protection zone 630 and the second protection zone 632 cooperate to provide the desired impact protection. The second protection zone 632 may be positioned directly outboard of a vehicle occupant such as the driver or front-seat passenger of the vehicle.

The inflatable curtain airbag 610 may have an upper portion 634 and a lower portion 636. The inflatable curtain airbag 610 may be formed from first and second fabric layers, which may be an inboard section 638 and an outboard section 639. The inboard section 638 and the outboard section 639 may define a first chamber 640 within the first protection zone 630 and a second chamber 642 within the second protection zone 632.

The first chamber 640 may be defined by a peripheral juncture that secures the inboard section 638 to the outboard section 639. The peripheral juncture may be formed with a wide variety of attachment methods and configurations including stitching, one-piece weaving, RF welding, ultrasonic welding, mechanical fastening, adhesive bonding, chemical bonding, or the like. In FIG. 20, the peripheral juncture may take the form of peripheral stitching 644 that generally encircles the periphery of the inflatable curtain airbag 610.

The inflatable curtain airbag 610 may also have one or more non-inflating regions 646 positioned within the space defined by the peripheral stitching 644. The non-inflating regions 646 may be defined by interior stitching 648 or alternatively, by a different form of attachment by which the inboard section 638 and the outboard section 639 are secured together within the space defined by the peripheral stitching 644.

The peripheral stitching 644 may also define a peripheral region 652 positioned outside the peripheral stitching 644. Within the peripheral region 652, the inboard section 638 and the outboard section 639 may be secured together, or may be left unattached. The peripheral region 652 may have a top portion 654, a bottom portion 656, a forward portion 658, and a rearward portion 660. The peripheral stitching 644 may similarly have a top portion 664, a bottom portion 666, a forward portion 668, and a rearward portion 670. The top portion 654 may be positioned generally above the top portion 664, the bottom portion 656 may be positioned generally below the bottom portion 666, and the rearward portion 660 may be positioned generally rearward of the rearward portion 670.

The top portion 654 of the peripheral region 652 may have an inflation conduit that conveys inflation gas from an inflator, such as the inflator 104 of FIG. 1, into the inflatable curtain airbag 610. The inflation conduit may take the form of a tube 106 like that of the airbag assembly 100 of FIG. 1. The tube 106 may extend through the top portion 654 of the peripheral region 652.

The top portion 664 of the peripheral stitching 644 may have a forward section 672 that resides above and defines the upper boundary of the second chamber 642. Additionally, the top portion 664 of the peripheral stitching 644 may have a rearward section 674 that resides above and defines the upper boundary of the first chamber 640.

As mentioned previously, the material of the top portion 654 of the peripheral region 652 may, in many cases, be waste material. In many known designs, the upper boundary of the inflatable portion of the inflatable curtain airbag is defined by a rectilinear shape such that all inflatable areas of the inflatable curtain airbag terminate at or proximate the same height. In some cases, an inflation conduit (such as the tube 106) may define the extent of material required within the top portion 654 of the peripheral region 652. The material forward of and/or rearward of such an inflation conduit may be wasted material.

In the inflatable curtain airbag 610, the material-sparing principles of the present invention may be applied to enhance the protection provided by the inflatable curtain airbag 610 without adding significantly to the material required to form the inflatable curtain airbag 610. More specifically, in the inflatable curtain airbag 610, the second chamber 642 may be extended upward into a region forward of the tube 106 that, in many known designs, is only wasted space. Thus, the forward section 672 of the peripheral stitching 644 may be significantly higher than the rearward section 674 of the peripheral stitching 644 when the curtain is arranged vertically as shown in FIG. 20.

Consequently, the second protection zone 632 may extend to a height greater than that of the first protection zone 630. As a result, the second protection zone 632 may, during inflation, abut the vehicle roof, roof rail, or other structure above the second protection zone 632. This abutment may push the second protection zone 632 downward so that the bottom of the second protection zone 632 extends to a depth within the vehicle that would not be reached without the extra height of the second protection zone 632. The bottom of the second protection zone 632 may extend below the bottom of the first protection zone 630.

Figure 21:
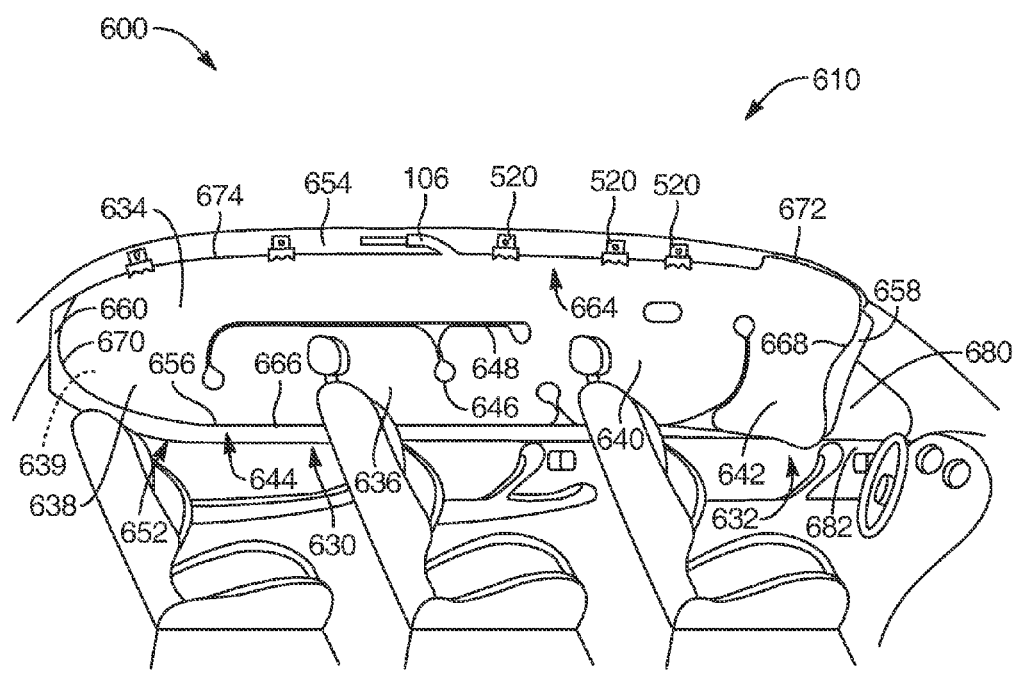
FIG. 21 is a side elevation view of the inflatable curtain airbag of FIG. 20 in the deployed configuration.

This may be desirable, for example, to help protect the driver and/or the front seat occupant of the vehicle from ejection through the vehicle window due to a lateral impact or vehicle rollover. If desired, the second protection zone 632 may extend to such a depth that the bottom of the second protection zone 632 is positioned below the bottom of the window, inboard of the portion of the door residing below the window. Thus, the second protection zone 632 may resist pressure exerted by the occupant or other vehicle contents that urge the second protection zone 632 out of the window. Thus, the enhanced depth of the inflated second protection zone 632 may allow the second protection zone 632 to remain in its desired place between the vehicle occupant and the window, even in the event of a relatively forceful impact or rollover. This may be accomplished using airbag material that might otherwise be wasted. FIG. 21 illustrates the inflatable curtain airbag 610 in the deployed configuration, in greater detail.

Referring to FIG. 21, a side elevation view illustrates the inflatable curtain airbag 610 of FIG. 20 in the deployed configuration. As shown, the inflatable curtain airbag 610 may deploy such that the top of the second protection zone 632 extends higher than the top of the first protection zone 630 (by comparison with the height of the roof rail 112), thereby causing the extended top of the second protection zone 632 to abut the roof of the vehicle. The forward section 672 may thus be higher than a portion of the rearward section 674 adjacent to the forward section 672.

This may cause the second protection zone 632 to extend beyond the bottom of the window 680 that is generally covered by the second protection zone 632 so that the bottom of the second protection zone 632 is positioned in front of a door 682 underneath the window 680. Consequently, the inflatable curtain airbag 610 may provide enhanced resistance to pressures tending to urge the second protection zone 632 to move out of the window 680. The result may be superior protection, particularly from vehicle ejection in the event of a severe lateral impact or rollover.

The preceding description discusses, by way of example, inflatable curtain airbags made with cut-and-sew techniques by which two fabric layers, such as the inboard section 338 and the outboard section 339 of the inflatable curtain airbag 310 of FIG. 8, are attached together via sewing or the like. In such embodiments, the peripheral stitching 344 may be formed via sewing such that the non-inflating peripheral region 352 still has two distinct layers, i.e., the inboard section 338 and the outboard section 339.

However, the principles outlined above are equally applicable to airbags made with once-piece weaving (OPW) techniques. With such techniques, two fabric layers may be woven together at the edges in place of the sewing operation that may be used to form the peripheral stitching 344 of FIG. 8. The non-inflating peripheral region of such an embodiment may then have only one layer consisting of the inboard and outboard sections woven together. Unused portions of the non-inflating peripheral region may still be used to form one or more tethers at the top, rear, front, and/or bottom of the peripheral region. Similarly, in a one-piece woven airbag, a protection zone such as the second protection zone 632 of FIG. 20 may be extended to utilize material that would otherwise reside within the unused portion of the non-inflating peripheral region. The methods used for one-piece woven airbags may closely resemble the examples provided above for cut-and-sew airbags. Thus the present invention is not limited to cut-and-sew airbags, but may be used with one-piece woven airbags or airbags constructed with any other manufacturing methods known in the art.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 Para. 6. It will be apparent to those having skill in the art that changes may be made to the details of the above-described embodiments without departing from the underlying principles of the invention. Embodiments of the invention in which an exclusive property or privilege is claimed are defined as follows.

While specific embodiments and applications of the present disclosure have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present disclosure without departing from the spirit and scope of the disclosure.

What is claimed is:

1. An airbag assembly for use in a vehicle having a roof, an A-pillar, a window extending below the A-pillar, and a lateral surface positioned below the window, the airbag assembly for disposition proximate the roof of the vehicle to shield a vehicle occupant from impacting the window and the lateral surface of the vehicle, the airbag assembly comprising:
   an inflatable curtain airbag having a stowed configuration proximate the roof of the vehicle and a deployed configuration into which the inflatable curtain airbag deploys downward between the vehicle occupant and the lateral surface of the vehicle, the inflatable curtain airbag comprising a peripheral juncture that defines, interior to the peripheral juncture, a first protection zone and a second protection zone, and, exterior to the peripheral juncture, a non-inflating peripheral region;
   wherein, to move the inflatable curtain airbag from the stowed configuration to the deployed configuration, the first protection zone inflates and the second protection zone inflates forward of the first protection zone;
   wherein, in the deployed configuration, the peripheral juncture comprises a top portion comprising a rearward section defining an upper boundary of the first protection zone, and a forward section defining an upper boundary of the second protection zone;
   wherein, in the deployed configuration, the forward section is vertically offset from the rearward section such that the forward section is higher than a portion of the rearward section adjacent to the forward section; and
   wherein, in the deployed configuration, the second protection zone extends below the A-pillar to a depth sufficient to traverse the window and position a bottom portion of the second protection zone alongside the lateral surface.

2. The airbag assembly of claim 1, wherein, in the deployed configuration, the forward section abuts the roof of the vehicle to urge downward motion of a bottom portion of the second protection zone.

3. The airbag assembly of claim 1, further comprising an inflator, wherein the rearward section of the peripheral juncture further defines an inflation conduit positioned to convey gas from the inflator into a first chamber defined within the first protection zone, wherein, prior to installation in the vehicle, the inflation conduit and a second chamber defined within the second protection zone extend to approximately equal heights above the first protection zone.

* * * * *